United States Patent [19]

Ishida et al.

[11] Patent Number: 4,783,701
[45] Date of Patent: Nov. 8, 1988

[54] FOCUS CONDITION DETECTING DEVICE FOR USE IN A CAMERA

[75] Inventors: Tokuji Ishida, Osaka; Toshio Norita, Sakai, both of Japan

[73] Assignee: Minolta Camera Kabushiki Kaisha, Osaka, Japan

[21] Appl. No.: 905,686

[22] Filed: Sep. 9, 1986

Related U.S. Application Data

[60] Division of Ser. No. 763,338, Aug. 6, 1985, Pat. No. 4,660,995, which is a continuation of Ser. No. 669,107, Nov. 7, 1984, abandoned.

[30] Foreign Application Priority Data

| | | | |
|---|---|---|---|
| Nov. 8, 1983 | [JP] | Japan | 58-210664 |
| Nov. 17, 1983 | [JP] | Japan | 58-217391 |
| Dec. 5, 1983 | [JP] | Japan | 58-230372 |
| Dec. 12, 1983 | [JP] | Japan | 58-234551 |
| May 15, 1984 | [JP] | Japan | 59-98367 |

[51] Int. Cl.$^4$ .............................................. H04N 3/14
[52] U.S. Cl. ........................... 358/213.19; 358/213.31
[58] Field of Search ...................... 358/213.13, 213.19, 358/213.26, 213.31; 357/24 LR

[56] References Cited

U.S. PATENT DOCUMENTS

| | | | |
|---|---|---|---|
| 3,934,161 | 1/1976 | Caywood | 307/311 |
| 4,032,934 | 6/1977 | Hendrickson et al. | 354/25 |
| 4,293,207 | 10/1981 | Aoki et al. | 354/25 |
| 4,320,946 | 3/1982 | Aoki et al. | 354/25 |
| 4,410,258 | 10/1983 | Aoki et al. | 354/25 |
| 4,410,261 | 10/1983 | Masunaga et al. | 356/1 |
| 4,412,741 | 11/1983 | Stein | 356/1 |
| 4,529,886 | 7/1985 | Yokoyama et al. | 358/213.19 |
| 4,541,016 | 9/1985 | Ochi et al. | 358/213.13 |
| 4,597,014 | 6/1986 | Suzuki | 358/213.13 |
| 4,460,836 | 7/1984 | Tsunekawa et al. | 307/311 |

FOREIGN PATENT DOCUMENTS 53-141030 5/1977 Japan .

OTHER PUBLICATIONS

Fairchild Semiconductor 1975 catalogue "MOS/CCD Databook" 1975, pp. 5-12, 14, 16, and 17.
IEEE Transactions on Electronic Devices, Dec. 1966, vol. ED-13, No. 12, "Monolithic Mosaic of Photon Sensors for Solid State Imaging Applications" by Schuster et al.
IEEE Transactions on Electronic Devices, Nov. 1971, vol. ED-18, No. 11, Charge-Coupled Imaging Devices: Experimental Results, Tompsett et al.; Self-Scanned Image Sensors Based on Charge Transfer by the Bucket-Brigade Method, Weimer et al.

Primary Examiner—Jin F. Ng
Assistant Examiner—Stephen Brinich
Attorney, Agent, or Firm—Price, Gess & Ubell

[57] ABSTRACT

A focus detecting device for a camera is disclosed which employs a CCD for producing an image signal carrying focus information. A monitoring circuit has a charge storing circuit for storing the charge generated from a light receiving element, so that the monitoring circuit monitors the amount of light received from the target object to be photographed and produces a charge signal representing the monitored amount. A reference signal generator is provided for producing a reference signal. Since the reference signal generator is defined by the same circuitry as the charge storing circuit, undesirable fluctuation in the charge signal will also be seen in the reference signal. Since undesirable fluctuation in both signals can be counterbalanced with each other, the comparison between the charge signal and the reference signal can be done with high accuracy.

16 Claims, 12 Drawing Sheets

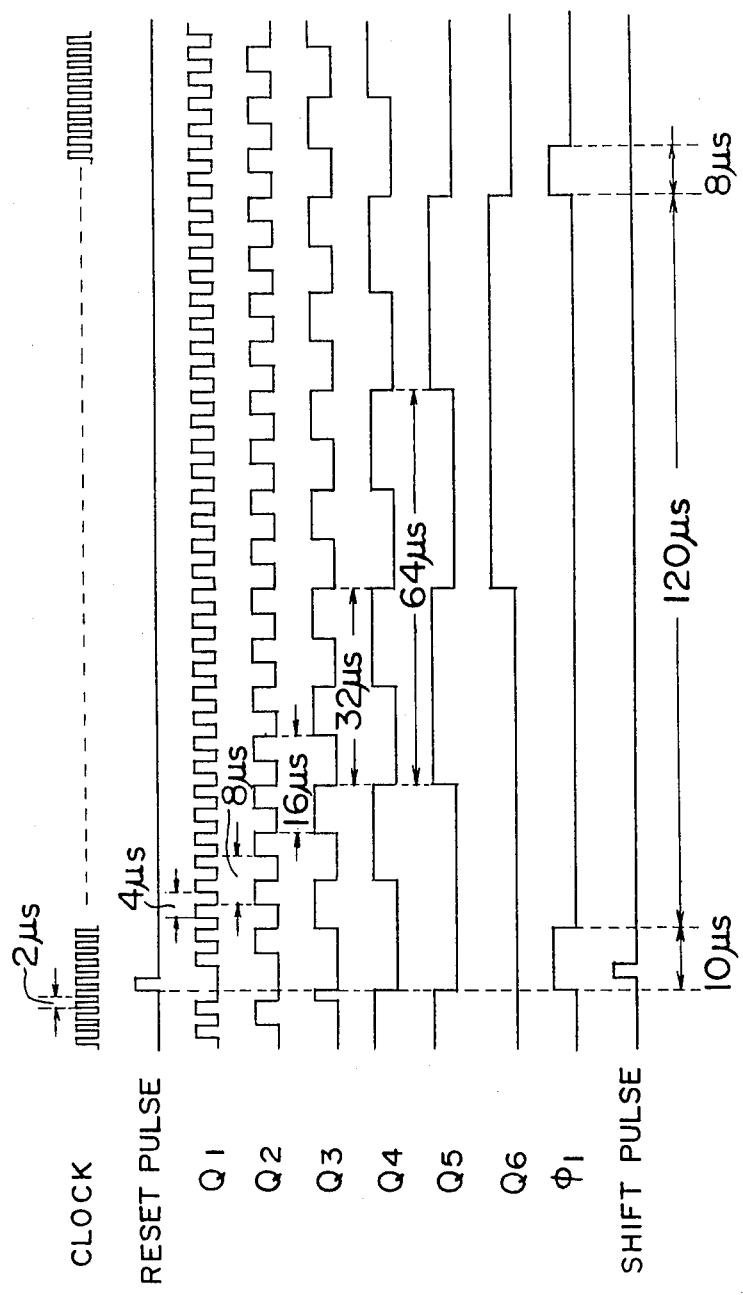

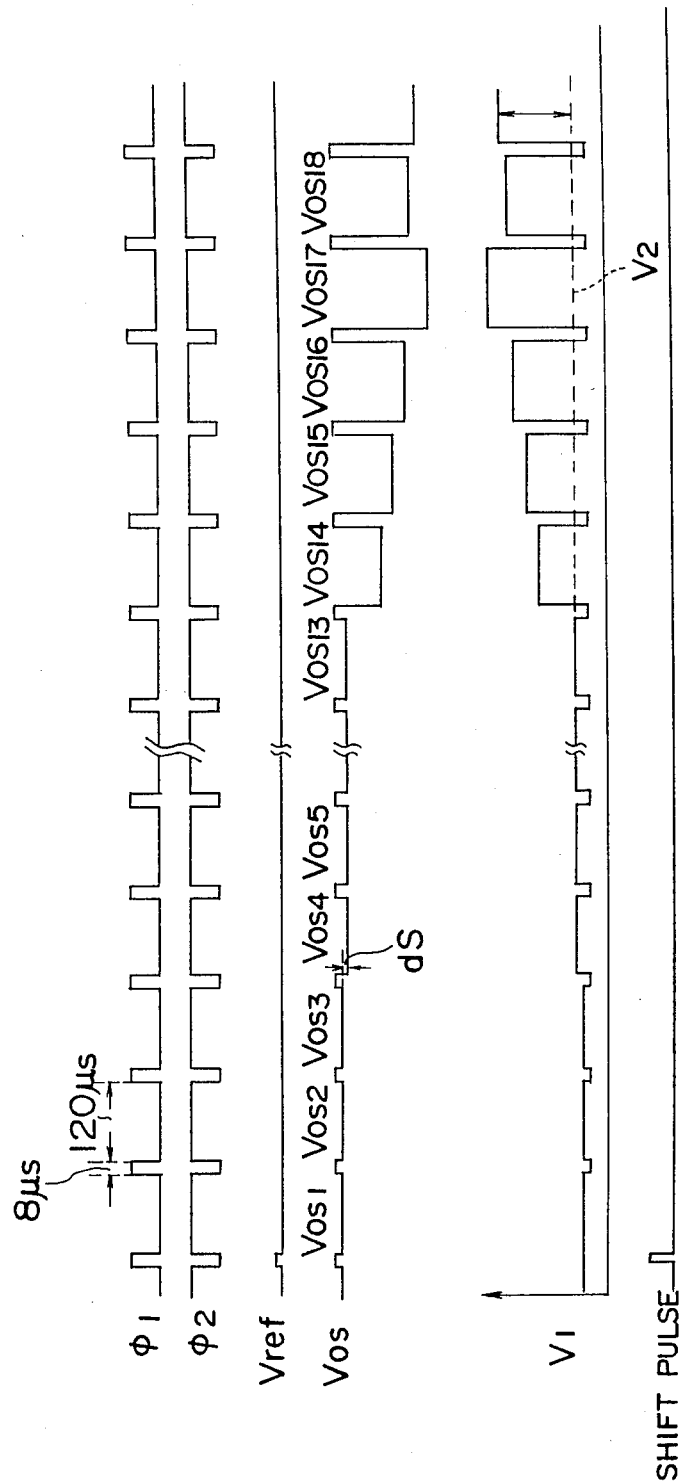

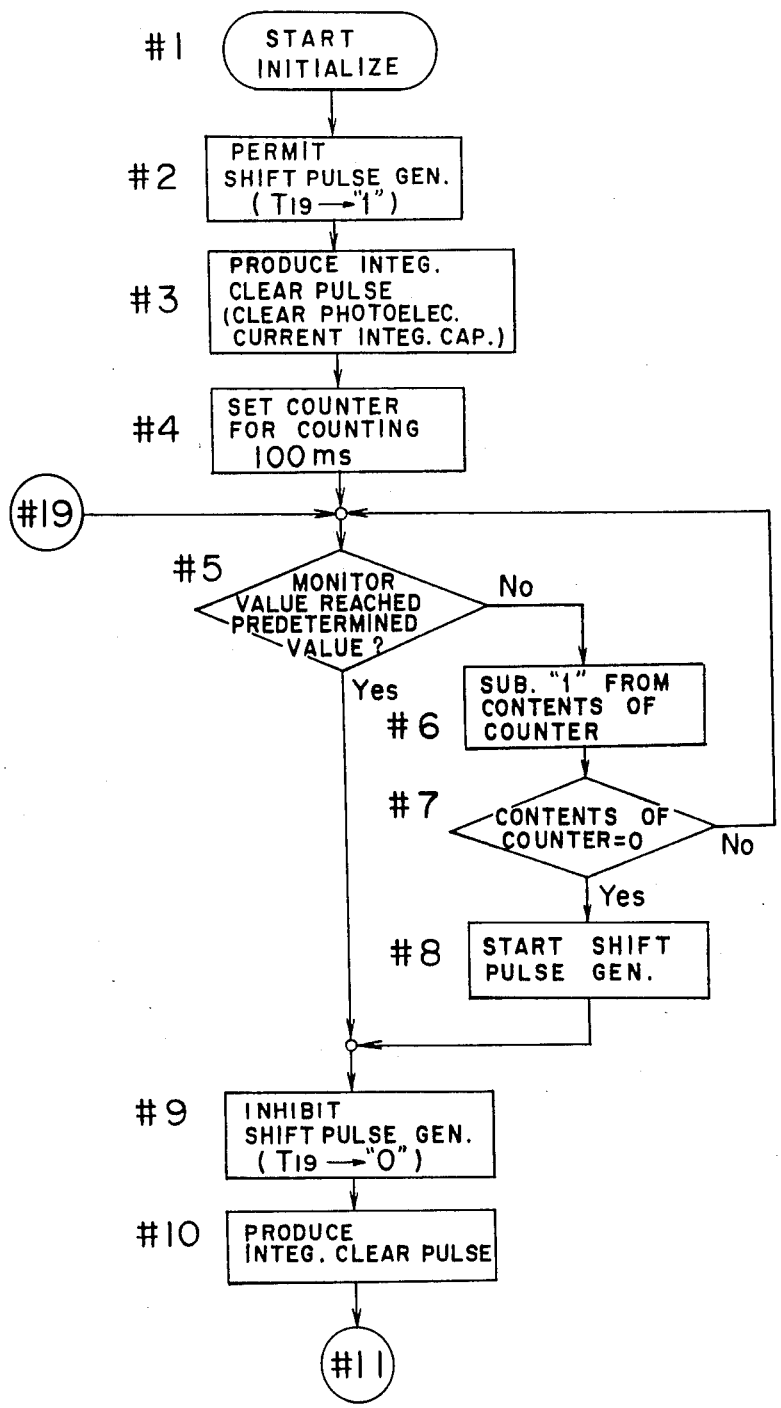

FOCUS CONDITION DETECTING DEVICE FOR USE IN A CAMERA

This is a division of application Ser. No. 763,338, filed on Aug. 6, 1985, now U.S. Pat. No. 4,660,995, which is a continuation of application Ser. No. 669,107, filed on Nov. 7, 1984 and now abandoned.

BACKGROUND OF THE INVENTION

1. Field of the invention

The present invention relates to a focus detecting device for use, for example, in a camera, and provided with a self-scanning type image sensor having an image sensor array defined by a charge accumulation portion and charge transfer portion for transferring the accumulated charge.

2. Description of the Prior Art

A self-scanning type image sensor is known in the prior art, and is defined by a CCD (Charge Coupled Device) having a photodiode array serving as a charge accumulation portion and a CCD shift register serving as a charge transfer portion. When a positive going pulse, which is generally called an integration clear pulse, is applied to the CCD, all the photodiodes in the photodiode array are once charged up to the level approximately equal to the voltage of power source. Then, when the integration clear pulse disappears, the discharge starts at a speed relative to the intensity of light impinging on each photodiode. Since such a discharge can be regarded as a negative charge, it is referred to as "an accumulation of charge" in the description herein. Then, when the next positive going pulse, which is generally called a shift pulse, is applied to the CCD, the accumulated charge in each photodiode is transferred to a corresponding cell in the charge transfer portion. Then, in accordance with the transfer clock pulses, the charge stored in the transfer portion is sequentially transferred to an image signal output circuit. From the image signal output circuit, the accumulated charge, which is changed to a voltage signal, is produced. Then, the voltage signal is converted to a digital signal for being processed in a processor through a certain program, thereby producing a signal representing the focus condition of the image formed on the photodiode array.

According to the above described image sensor, it is necessary to control the time when to produce the shift pulse with respect to the brightness of the aiming object. Otherwise, if the shift pulse is produced always with the same time interval from the start of the charge accumulation, the accumulated charge will be very low when the object is very dark and, on the contrary, the accumulated charge in each photodiode will saturate when the object is very bright. In either one of the above cases, the obtained image signal becomes very poor. Accordingly, it is necessary to provide a means for varying the time when to produce the shift pulse in accordance with the brightness of the object. Such a varying means includes a monitor light receiving means, a monitoring circuit for producing a voltage signal varying at a speed dependent on the brightness of the object detected by the monitor light receiving means, and a comparing means for comparing the voltage signal from the monitoring circuit with a reference voltage. When the integration clear pulse disappears, the voltage signal from the monitoring circuit gradually decreases at a speed dependent on the brightness of the object detected by the monitor light receiving means. The voltage signal is compared with the reference voltage in the comparing means, and when the voltage signal is reduced to a level equal to the reference voltage, the shift pulse is generated.

In the above described arrangement, the problem is the reliability of the reference voltage, as explained below.

Upon disappearance of the integration clear pulse, the voltage signal from the monitor circuit starts to drop at a speed determined by the brightness of the object. Also, the voltage signal which has been produced before the generation of the integration clear pulse is variable depending on the brightness of the object and other factors. Accordingly, it is very difficult to obtain the reference voltage from the output of the monitoring circuit itself.

To solve the problem, the reference voltage may be supplied from a constant voltage source. However, when the voltage from a power source, supplying power to the monitoring circuit, varies, the initial voltage of the voltage signal produced upon disappearance of the integration clear pulse varies. Accordingly, the result of the comparison will also become poor when the reference voltage is constant regardless of various environmental changes, but if the voltage signal varies not only by the change in the brightness of the object, but also by the other environmental changes, such as a temperature change. Accordingly, it may happen such that, while aiming at the same object, the timing of generation of the shift pulse may change relative to the temperature change.

Another approach to solve the problem is to generate the reference voltage using the same power source as that for the monitoring circuit, but the problem still remains. More specifically, the change in the voltage signal by the environmental change is partly dependent on the monitoring circuit itself, and also the power source produces much noise signal which is not preferable for the reference voltage.

Furthermore, the shift pulse should be generated relatively to the transfer-clock pulses. Generally, a self-scanning type image sensor, such as a CCD, requires at least two sets of clock pulses of different phases for the transfer of the accumulated charge. The charge in each cell is transferred in response to the step-down of the transfer-clock pulse of a particular phase. Accordingly, the shift pulse should be produced while the transfer-clock pulse is still in HIGH (stepped up) state. Conventionally, since the transfer-clock pulse is always produced at a given frequency, the generation of the shift pulse is delayed until the transfer-clock pulse changes its state to HIGH, in the case when the comparing means detects that the voltage signal is reduced to a level equal to the reference voltage, during the clock pulse in LOW state. Such a delay in the generation of the shift pulse undesirably extends the charging period, thereby saturating the charge in each photodiode, particularly when the aiming object is bright.

Also, conventionally, the photodiode array starts to accumulate charge after completing the previous cycle of focus detection, i.e., after processing the image signal in the processor through a certain program. In other words, the integration clear pulse is produced always after the completion of the image signal processing in the processor. Since the speed of charge accumulation in the photodiode array is in relation to the brightness of the object, it is necessary to continue the charge accumulation for a relatively long period of time when a dark object is aimed, eventually resulting in the prolongation of one focus detection cycle. Thus, the number of focus detection cycles which can be carried out in a certain period of time will be reduced. When the focus detecting device of the above described type is employed in a camera which automatically moves the objective lens in succession in accordance with the signal representing the detected focus condition with the focus condition detection repeated, it will take a relatively long time before the lens is moved to the proper focusing position, thereby losing a good picture shooting chance.

In addition, since at least two sets of clock pulses of different phases for the transfer of the accumulated charge are necessary, the duty cycle of the clock pulse in each phase is usually defined as 50% in conventional focus detecting devices using CCD. Since the voltage signal representing the charge in each cell is transferred in response to the step-down of the transfer-clock pulse of a particular phase, and since the noise signals will be produced at the step-up of the transfer-clock pulse, it is necessary to complete the A/D conversion of the voltage signal from the image signal output circuit in a time interval between the step-down of the pulse and the step-up of the subsequent pulse. Since the time interval between the subsequent pulses is very short, particularly with the 50% duty cycle, it is necessary to provide a high speed A/D converter, which is very expensive, resulting in the high manufacturing cost of the camera. A sample-hold circuit may be employed to temporarily hold the voltage signal for use in combination with a moderate speed A/D converter. However, such a sample-hold circuit requires a capacitor, which must be connected externally of the chip carrying various electronic elements, resulting in bulky in size and high manufacturing cost.

There are still other problems in conventional focus detecting devices using the self-scanning type image sensor. When the power switch is turned on, unwanted charges are accumulated in the photodiode array which must be cleared away before the first detecting operation, or otherwise the signal obtained from the first detecting operation will not carry the correct image signal. Accordingly, the objective lens will not be moved to the proper focusing position. To this end, an initialize operation is carried out after the turn on of an operation start switch. The initialize operation is carried out by a so-called trial or idle transfer operation in which the unwanted charges are transferred from the photodiode array through the CCD shift register to the image signal output circuit, for example, with the signal produced by the image signal output circuit not used. Usually, to completely remove the unwanted charges, the trial transfer operation is carried out for a several times repeatedly. Since such a trial transfer operation is carried out at the same speed as the normal transfer operation which can not be made faster due to the various factors, such as the speed of the A/D conversion, it takes time before the camera is ready to take a first picture. Thus, one may lose a good picture shooting chance in this respect also.

Even if the trial transfer operation can be made faster than the normal transfer operation, the problem still exists as explained below.

It is to be noted that the CCD shift register itself is sensitive to light, such that the charge in each cell of the CCD shift register increases, although very slowly, but, relatively to the light impinging thereon. It is assumed that the CCD shift register is disconnected from the photodiode array in the trial transfer operation and comprises seven cells aligned in a row. It is also assumed that the fast trial operation is carried out by fast transfer-clock pulses having a high frequency fH, which is higher than the frequency fL of the normal transfer-clock pulse for the normal transfer operation.

Now description is given to the last trial transfer operation. At the moment of the completion of the next to the last trial transfer operation, there are accumulated unwanted charges "6q", "5q", "4q", "3q", "2q" and "q" in the first to sixth cells, respectively, and the seventh cell is empty. Until the first fast transfer-clock pulse for the last trial transfer operation is produced, that is for a period 1/fH, each cell accumulates unwanted charge "q". When the first fast transfer-clock pulse for the last trial transfer operation is produced, unwanted charge "7q" in the first cell in the CCD shift register is outputed from the CCD shift register, unwanted charge "6q" in the second cell is moved to the first cell, unwanted charge "5q" in the third cell is moved to the second cell, and in this manner, unwanted charge in the last seventh cell "q" is moved to the sixth cell.

Until the second fast transfer-clock pulse is produced, that is for a period 1/fH, each cell further accumulates unwanted charge "q". Then, when the second fast transfer-clock pulse is produced, the same brigade operation is carried out.

In this manner, the last trial transfer operation completes when the seventh fast transfer-clock pulse is produced. When the seventh fast transfer-clock pulse is produced, the first cell receives unwanted charge "6q", the second cell receives unwanted charge "5q", and in this manner, the sixth cell receives unwanted charge "q" while the seventh cell becomes empty and the CCD register starts to accumulate unwanted charges from the beginning.

After the last trial transfer operation, the normal transfer operation starts using the normal transfer-clock pulse.

Until the first normal transfer-clock pulse is produced, that is for a period 1/fL, each cell further accumulates unwanted charge "Q" which is a greater than the charge "q". When the first normal transfer-clock pulse is produced, the unwanted charge in the first cell, which is now equal to "6q+Q", is outputed from the CCD shift register. Similarly, unwanted charge "5q+Q" in the second cell is moved to the first cell, unwanted charge "4q+Q" in the third cell is moved to the second cell, and in this manner, unwanted charge "Q" in the last seventh cell is moved to the sixth cell.

Then, when the second normal transfer-pulse is produced, the first cell outputs unwanted charge "5q+2Q". Then, when the third normal transfer-pulse is produced, the first cell outputs unwanted charge "4q+3Q". In this manner, until the seventh normal transfer-pulse, the unwanted charge outputed from the CCD shift register changes "6q+Q", "5q+2Q", "4q+3Q", "3q+4Q", "2q+5Q", "1q+6Q" and "7Q". Thus, in the first cycle of the normal transfer operation, the unwanted charge is not constant but varies increasingly, thereby causing an error in the focus detection.

SUMMARY OF THE INVENTION

The present invention has been developed with a view to substantially solving the above described disadvantages and has for its essential object to provide an improved image position detecting device having an improved focus detecting device which produces an image signal properly corresponding to the light intensity distributions detected by the self-scanning type image sensor, thereby permitting the focus adjustment of the objective lens with a high accuracy.

It is another object of the present invention to provide a focus detecting device of the above described type which can produce a reference voltage which has a high reliance to the output signal from the monitoring circuit.

Is is a further object of the present invention to provide a focus detecting device of the above described type which can produce a shift pulse without undesirable delay in response to achievement of a given relationship between the reference voltage and the output signal from the monitoring circuit.

It is yet another object of the present invention to provide a focus detecting device of the above described type which can complete the focus detection operation in a relatively short period of time even when the brightness of the aiming object is relatively low, thereby permitting fast focus adjustment of the objective lens in accordance with the serial focus detection operations.

It is a still further object of the present invention to provide a focus detecting device of the above described type wherein the period for the A/D conversion for each picture element signal is made long enough for a moderate speed A/D converter.

It is another object of the present invention to provide a focus detecting device of the above described type wherein the trial transfer operation can be carried out without affecting the subsequent normal transfer operation.

In accomplishing these and other objects, a focus condition detecting device according to the present invention comprises: an optical system arranged to receive light from an object through the objective lens and to form object images whose intensity distributions vary with the focus condition of the objective lens; a self scanning type image sensor arranged to receive the intensity distributions thereon, the image sensor including a row of photocells and integration means provided for each set photocell for integrating the photocurrent produced by the corresponding photocell and storing electrical charge at a speed dependent on the amount of the photocurrent and a shift register adapted to receive the electrical charges stored in the integration means for transfer and output thereof; means for generating a clear pulse which causes the integration means to clear the electrical charges stored therein, the integration means starting the integration and the storage of the electrical charges in response to disappearance of the clear pulse; means for generating a shift pulse which shifts the stored electrical charges to the shift register; means for generating at least two sets of transfer pulses which cause the shift register to transfer the shifted electrical charges therein and to generate them as outputs in a serial manner; means for converting the outputs of the shift register into picture element signals which constitute a video signal representative of the intensity distributions each time the shift register generates its output; means for processing the video signal in accordance with a predetermined program to generate a signal representative of the focus condition of the objective lens; means for detecting the brightness of the object; a monitor circuit having an input terminal connected to the detecting means, the monitor circuit including first charge storing means connected to the input terminal and a first buffer circuit connected to the first charge storing means and having high input impedance and low output impedance, and the first charge storing means storing electrical charge at a speed dependent on the brightness of the object detected by the detecting means in response to the disappearance of the clear pulse so that the first buffer circuit generates a time varying output which varies with the advance of the storage of the charge by the first charge storing means while the first charge storing means is cleared in response to the clear pulse so that the output of the first buffer circuit is restored to a given initial voltage level; a reference output generating circuit having an open input terminal, the reference output generating circuit including second charge storing means connected to the open input terminal and having the same characteristics as the first charge storing means and a second buffer circuit connected to the second charge storing means and having the same characteristics as the first buffer circuit, and the second charge storing means being cleared in response to the clear pulse and maintaining the cleared state even after the disappearance of the clear pulse so that the second buffer circuit constantly generates a reference output which is at the given initial voltage level; a comparator comparing the time varying output of the first buffer circuit with the reference output of the second buffer circuit to invert its output when the former output represents a given relationship with respect to the latter output; and shift pulse generation control means for causing the shift pulse generating means to generate the shift pulse in response to the inversion of the output of the first comparator.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIGS. 7 and 8 are graphs showing waveforms of signals obtained at various major points in the circuit of FIG. 1;

FIGS. 9a and 9b are flow charts showing the operation of the microcomputer provided in the first embodiment;

DESCRIPTION OF THE PREFERRED EMBODIMENTS

A preferred embodiment of the present invention will be described hereinafter with reference to FIG. 1 through FIG. 11.

Figure 1:
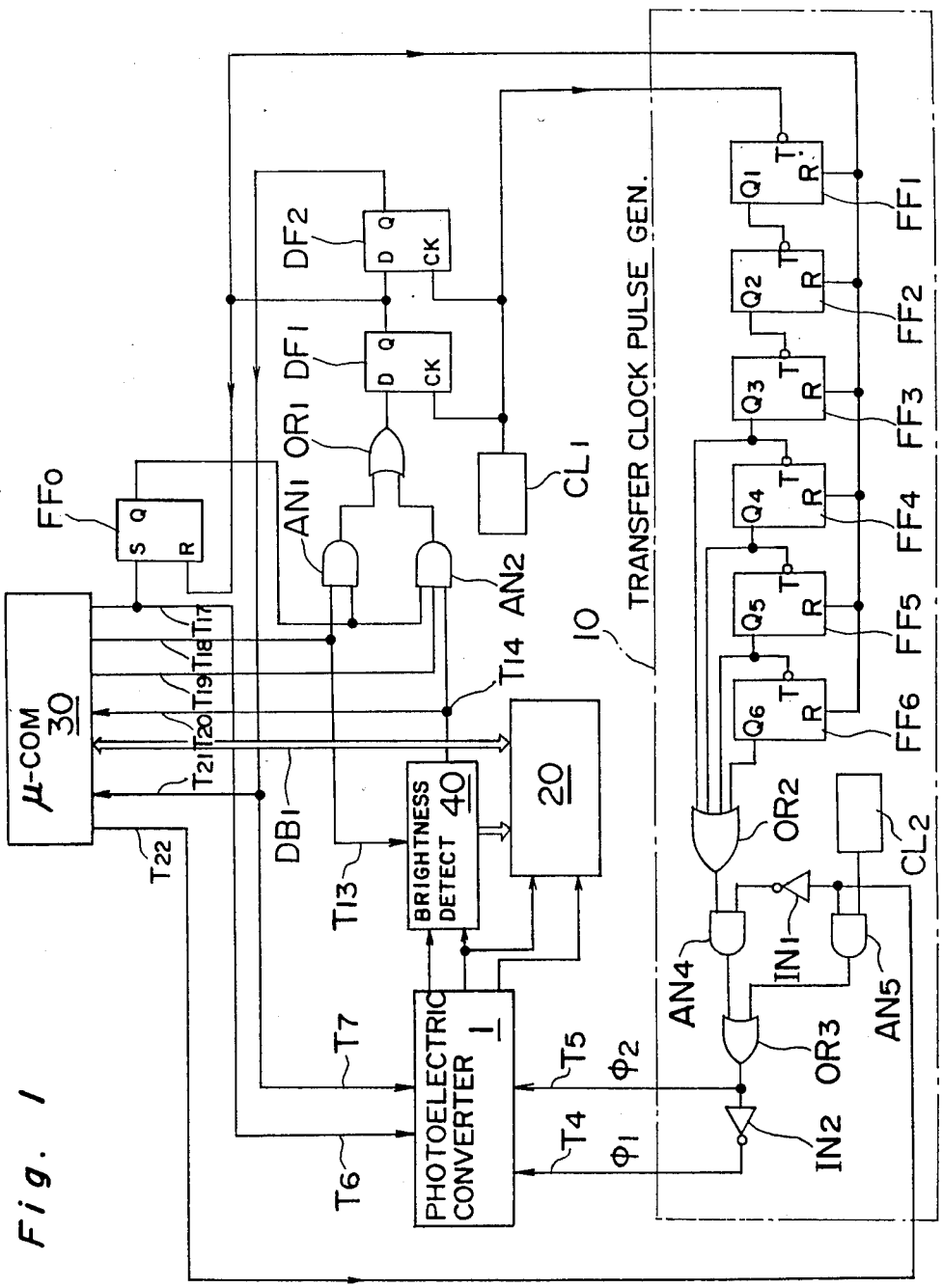
FIG. 1 is a circuit diagram of a focus detecting device according to a preferred embodiment of the present invention.

Referring to FIG. 1, showing the entire circuit of the preferred embodiment, a reference number 1 designates a photoelectric conversion block provided with a self-scanning type image sensor, such as a CCD, an image signal output circuit, a light receiving element for use in the monitoring of the brightness, a brightness monitoring circuit, and a reference signal generating circuit. A reference number 10 is a transfer-clock pulse generating block, and 20 is a circuit block for forming digital signals, serving as a base for judging the focus adjusting condition of the objective lens according to the signal from the photo-electric conversion block 1. A reference number 30 is a microcomputer which judges the focus adjusting condition of the objective lens according to the digital signal from circuit block 20 and controls the operation of each circuit block.

Also, 40 is a brightness detecting circuit, which controls the amplification factor of an amplifier located in circuit block 20 and controls the electric charge storing time (photocurrent integration time) of a self-scanning type image sensor located in photoelectric conversion block 1. Reference character AN1 and AN2 are AND circuits which construct gate means together with an OR circuit OR1. A reference character DF1 is a D flip-flop for generating reset pulse for resetting flip-flops FF0, FF1 FF2, FF3, FF4, FF5 and FF6, which will described later. A reference character DF2 is a D flip-flop for generating shift pulses, which transfer the electric charge accumulated in the electric charge accumulation portion in an image sensor to a transfer portion. A reference character CL1 is a clock circuit for generating reference clock pulses, and FF0 is a R-S flip-flop.

Figure 2:
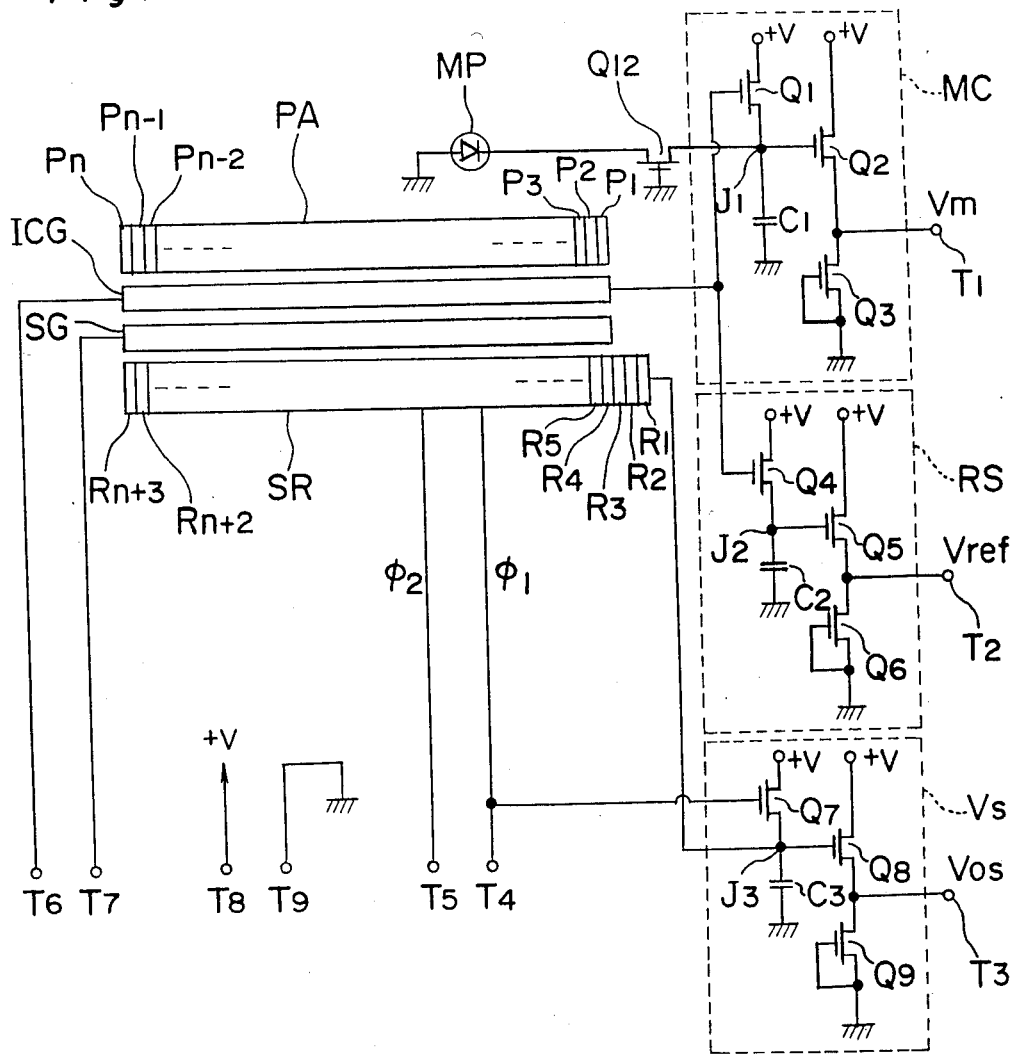
FIG. 2 is a circuit diagram showing the detail of photoelectric conversion circuit (1) shown in FIG. 1.
Figure 3:
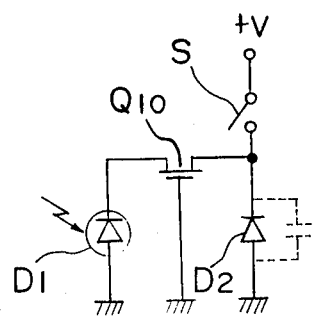
FIG. 3 is a circuit diagram showing an equivalent circuit of a photodiode and an integration clear pulse gate provided for each picture element in an image sensor array.

FIG. 2 shows the detail of the above-described photoelectric conversion block 1. The above-described self-scanning image sensor comprises: an image sensor array PA defined by photodiodes P1, P2, P3 ... $P_{n-2}$, $P_{n-1}$ and $P_n$ aligned in a row; integration clear gate ICG; shift gate SG; and CCD shift register SR. The number of cells in CCD shift register SR, serving as a transfer portion is greater by 3 than the number of photodiodes (=the number of picture elements) of image sensor array PA, serving as an electric charge accumulation portion. Cells R1, R2 and R3 are used for the idle transfer, which will be described later. The electric charge accumulated in each of photodiodes P1, P2, P3 ... $P_{n-2}$, $P_{n-1}$ and $P_n$ of image sensor array PA is transferred to cells R4, R5, R6 ... $R_{n+1}$, $R_{n+2}$ and $R_{n+3}$. As shown in FIG. 3, each photodiode is defined by a pair of diodes D1 and D2 and connected in parallel to each other through FET Q10. Switch S, representing an integration clear gate ICG, is provided for the supply of power from source of power +V. One D1 of two diodes D1 and D2 is so arranged as to receive light. FET Q10 has its gate connected to ground and is provided to maintain the voltage across diode D1 almost constant to neglect the capacitive component of diode D1. When switch S closes, the electric charge will be accumulated between the anode and cathode of diode D2 so that the anode voltage becomes equal to the power supply voltage. Then when switch S opens, diode D2 is discharged through the FET Q10 by the photoelectric current produced by diode D1 so that the anode voltage drops relatively to the time. It may be considered that the negative charge is accumulated in the cathode of diode D2 at a speed corresponding to the intensity of the light impinging on diode D1. Accordingly, the accumulation of the electric charge is carried out at a speed corresponding to the intensity of light impinging on each of the photodiodes.

Switch S1 is defined by a semiconductor analog switch, which makes when an integration clear pulse is applied to integration clear gate ICG and breaks when the pulse disappears. Upon receipt of a shift pulse, shift gate SG transmits the accumulated electric charge in photodiodes P1, P2, P3 ... Pn−2, Pn−1, and Pn parallelly to cells R4, R5, R6 ... Rn+1, Rn+2 and Rn+3 of CCD shift register SR. The generation of the shift pulse will be described later. The charge accumulation in photodiodes P1, P2, P3 ... Pn−2, Pn−1 and Pn will be completed when the shift pulse is applied to shift gate SG. Also, while the clock pulses $\phi 1$, $\phi 2$, which will be described later, are inputted, CCD shift register SR sequentially outputs the accumulated charge in one cell to an image signal output circuit, which will be described later, in response to the negative edge of the transfer clock pulse $\phi 1$. A predetermined number of, such as ten, photodiodes P1, P2 ..., and P10 counted from one end of the image sensor array PA are covered with an aluminum film and are used for the correction of the smear in the image signal as will be described later. Terminals T8 and T9 shown in FIG. 2 are provided for the power supply of +V to the above-described image sensor and circuits MC, RS and VS.

Figure 4:
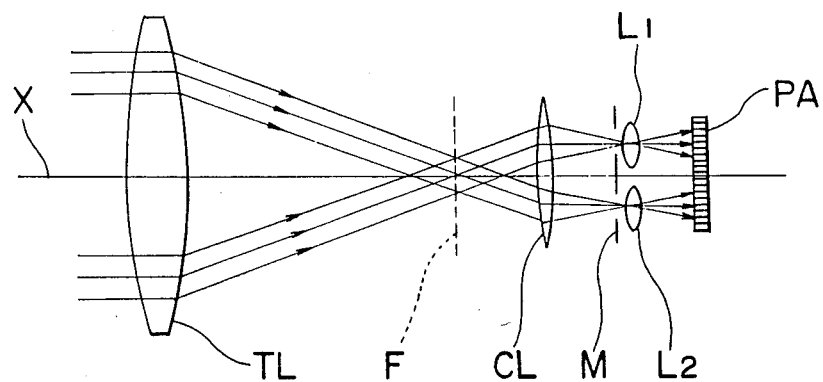
FIG. 4 is a diagrammatic view showing an optical arrangement employed for the focus detecting device of the present invention.

The position where to put image sensor array PA in a camera body is dependent on the type of focus detection system. FIG. 4 shows an optical arrangement of one example of a focus detection system to which this invention can be applied. In FIG. 4 TL is an objective photograph lens, CL is a condensing lens, L1 and L2 are a pair of reimaging lenses symmetrically disposed with respect to the main optical axis X of the objective lens TL, M is a mask, F is an image forming plane of the objective lens TL and is equivalent to a plane on which the film extends. According to the optical system shown, when an image of the object (not shown) is focussed exactly on or adjacent on image forming plane F by objective lens TL, each of reimaging lenses L1 and L2 reforms the image on image sensor array PA. The output signal from the image sensor array PA represents the luminance of the image. The reformed images by reimaging lenses L1 and L2 are referred to as first and second images, respectively. The distance between the first image and the second image on image sensor array PA changes relatively to the focus condition of the image formed by objective lens TL, i.e., relatively to the degree of defocus of the imaging formed on image forming plane F. Accordingly, by the detection of the distance between the first image and the second image in accordance with the output of each picture element of the image sensor array PA, it is possible to detect the amount and direction of the defocus. The detail of the defocus detection will be described later. In FIG. 4, image sensor array PA is located at a conjugate position, or at a vicinity thereof, with respect to image forming plane F, relatively to condensing lens CL and a pair of reimaging lenses L1 and L2.

Figure 5:
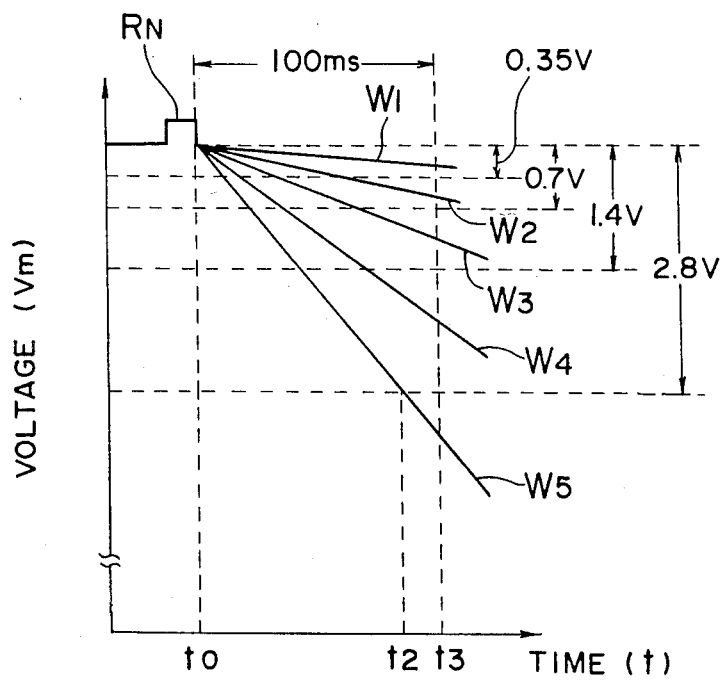
FIG. 5 is a graph showing an output signal from a monitoring circuit.

Referring back to FIG. 2, MP designates a photodiode which is provided for monitoring brightness. A block MC is a brightness monitoring circuit, a block RS is a reference signal generating circuit and a block VS is an image signal output circuit. The brightness monitoring circuit MC is defined by FETs, Q1, Q2 and Q3 and capacitor C1. FET Q1 has its gate connected to integration clear gate 3 of the above-described image sensor, and is made conductive upon receipt of an integration clear pulse obtained through integration clear gate ICG. Accordingly, capacitor C1 is charged to the level equal to the voltage +V of the power source shifted by the given voltage drop by FET Q1. The junction J1 between FET Q1 and capacitor C1 is connected to the anode of photodiode MP through FET Q12 and also to the gate of FET Q2. The FET Q12 has its base grounded and is provided to maintain the voltage across photodiode MP almost constant. FET Q12 is also so arranged that its capacitive component can be neglected. FETs Q2 and Q3 are connected in series, between the power supply and ground, and constitutes a buffer, which has a low output impedance and a high input impedance. Since FET Q3 is used as a source follower, a voltage Vm corresponding to the electric potential at junction J1 is produced from output terminal T1 extending from the junction between FETs Q2 and Q3. When the integration clear pulse disappears, FET Q1 becomes non-conductive. Accordingly, capacitor C1 starts to discharge by the photoelectric current from photodiode MP, resulting in the decrease of the output voltage at terminal T1. The graph in FIG. 5 shows the change of the output voltage at terminal T1 with respect to time in which lines W1, W2, W3, W4 and W5 represent different objects having different brightness. In FIG. 5, a step-up portion indicated by RN represents an induction noise caused by the integration clear pulse.

The reference voltage generating circuit RS is defined by FETs Q4, Q5 and Q6 and capacitor C2, which have the same characteristics as those of the above-described FETs Q1, Q2 and Q3 and capacitor C1, respectively. Furthermore, the circuit connection is very similar to that in brightness monitor circuit MC. The only difference is that junction J2 beween FET Q4 and capacitor C2 is connected only to the gate of FET Q5. Accordingly, FETs Q5 and Q6 define a buffer having a low output impedance and a high input impedance, and the voltage signal produced from output terminal T2 connected to a junction between FETs is Q5 and Q6 is maintained constant even after the disappearance of the integration clear pulse, as shown in FIG. 8. Accordingly, the integration clear pulse disappears, that is, after time t0, the voltage level at junction J2 is exactly the same as junction J1, due to the same characteristics between Q1 and Q4, between Q2 and Q5, between Q3 and Q4 and between C1 and C2, so that the voltage signal produced from terminal T2 can be used as reference voltage V ref for obtaining the degree of voltage drop of the voltage signal produced from terminal T1.

An image signal output circuit VS is defined by FETs Q7, Q8 and Q9 and capacitor C3. Preferably, these elements should be selected as having the same characteristics as those of FETs Q1, Q2 and Q3 and capacitor C1. In the circuit connection, the one difference is that transfer clock pulse $\phi 1$ is applied to the gate of FET Q7. Also, junction J3 between FET Q7 and capacitor C3 is connected to the gate of the FET Q8 and also to the transfer terminal of CCD shift register 5 of the image sensor. FETs Q8 and Q9 define a buffer. Thus, each time one transfer pulse $\phi 1$ is applied, FET Q7 conducts at the positive edge of each pulse $\phi 1$, thereby charging capacitor C3 to a level equal to the power supply voltage +V shifted by the given voltage drop by FET Q7. Then, image signal output circuit Vs is reset. The discharging operation starts by the negative edge of the same pulse $\phi 1$, and the discharging speed is dependent on the accumulated charge transferred from CCD shift register 5. The above described charge and discharge are repeated in sync with the transfer pulse $\phi 1$. Accordingly, a signal corresponding to the accumulated electric-charge in each photodiode, representing a picture element of the image sensor is sequentially outputted as the voltage signal Vos from output terminal T3 connected to a junction between FETs Q8 and Q9. A series of these signals form an image or video signal.

It is to be noted that elements C1, C2 and C3 in the above described circuits MC, RS and VS have been described as capacitors, but each can be replaced with PN junction of a diode, particularly these circuits are formed in an IC chip. Also, photodiode MP provided for the monitor use is positioned in the vicinity of image sensor array PA so as to receive a part of the image which is formed by the objective lens.

Referring again to FIG. 1, an example of a transfer clock pulse generating block 10 for generating the transfer clock pulses $\phi 1$ and $\phi 2$ will be described hereinafter. Flip-flop circuit FF1, FF2, FF3, FF4, FF5 and FF6 are provided for forming a frequency dividing circuit. Clock pulses (one cycle period is 2 microseconds) from clock circuit CL1 are applied to the T terminal of the first stage flip-flop FF1. The Q terminals of flip-flops FF3, FF4, FF5, FF6 are all connected to OR circuit OR2 and the output of OR circuit OR2 is connected to one input of AND circuit AN4. The other input of AND circuit AN4 is connected to terminal T22 of microcomputer 30 through inverter IN1. When terminal T22 produces a signal "0", a signal "1" from OR circuit OR2 is produced from AND circuit AN4. AND circuit AN5 has one of its inputs connected to clock circuit CL2 and at its other input connected to terminal T22. Accordingly, when terminal T22 produces a signal "1", clock pulses from clock circuit CL2 are produced. The one cycle period of the clock pulses from clock circuit CL2 is much shorter than that of pulses from terminal Q of flip-flop FF6, for example, it is equal to one over several tens of one cycle period of the clock pulses from terminal Q6 of flip-flop FF6. When either AND circuit AN4 or AN5 produces a signal "1", OR circuit OR3 produces a signal "1", as a transfer clock pulse $\phi 2$, to CCD shift register SR provided in photoelectric conversion block 1. Also, an inverter IN2 is connected to OR circuit OR3. Inverter IN2 produces a signal having a phase opposite to the phase of pulse φ2, and it is fed to CCD shifter register SR provided in photoelectric conversion block 1, and also to image signal output circuit VS. Pulse φ1 serves as a transfer clock pulse. A signal "1" from terminal T22 of microcomputer 30 is to initialize the image sensor.

Figure 6:
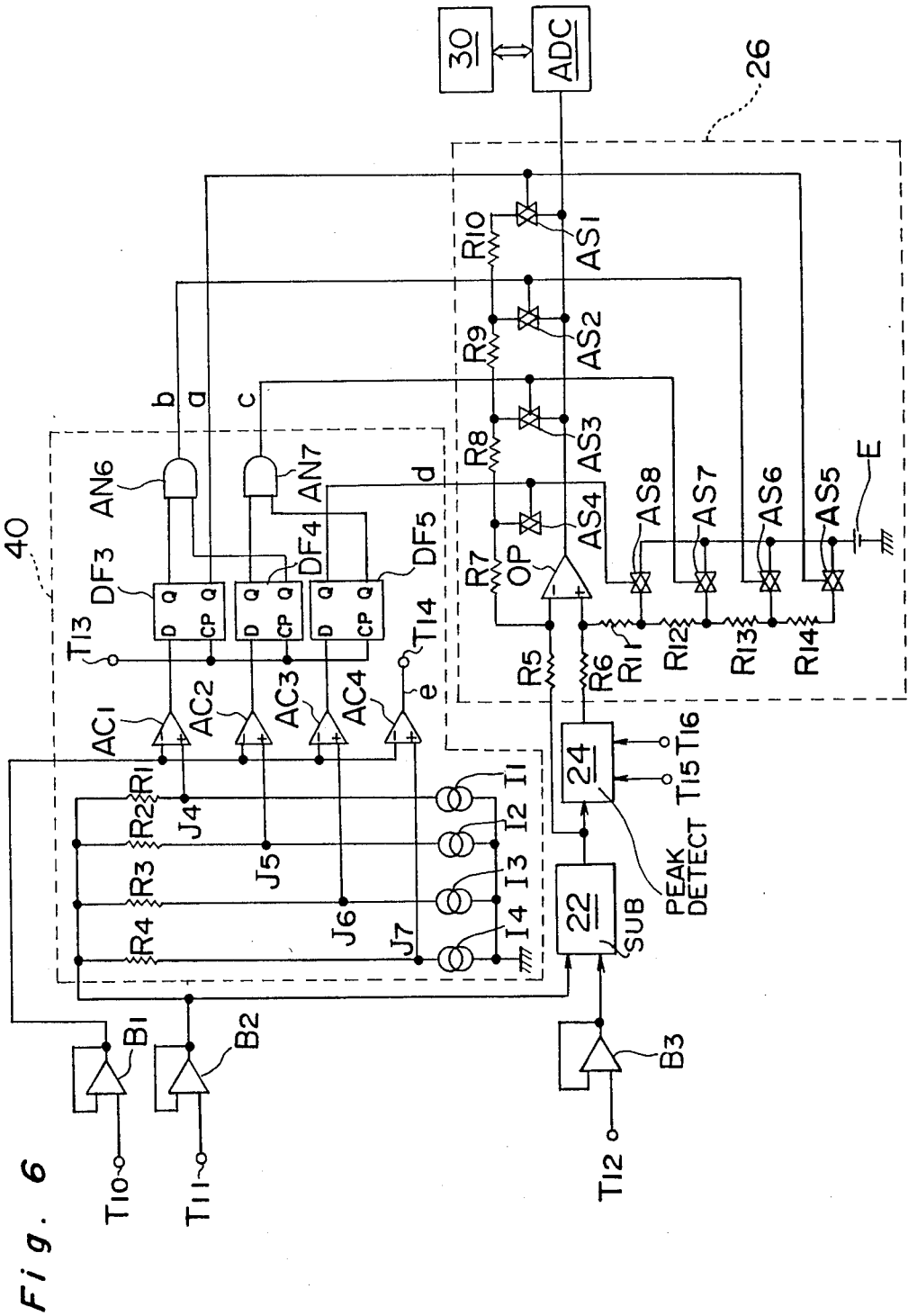
FIG. 6 is a circuit diagram showing the detail of brightness detection circuit (40) and block (20) shown in FIG. 1.

FIG. 6 shows an example of brightness detection circuit 40 and circuit block 20. In the drawing, T10, T11 and T12 designate terminals which are connected, respectively, to terminals T1, T2 and T3, shown in FIG. 2. As will be described later, a latch pulse, a sampling pulse, a sampling reset pulse are provided, respectively, to terminals T13, T15 and T16 through the line connected to terminal T18 and data bus DB1 from the microcomputer 30. Also, terminal T14 is connected to one input of AND circuit AN2 of FIG. 1. First, brightness detection circuit 40 is described. The circuit is provided with comparators AC1, AC2, AC3 and AC4 to detect a level of voltage drop of output voltage Vm from brightness monitoring circuit MC after the disappearance of the integration clear pulse. The inverting inputs of these comparators are connected to the terminal T10 through buffer B1. The non-inverting inputs of these comparators AC1, AC2, AC3 and AC4 are connected, respectively, to junction J4 between resistor R1 and the constant-current source 11, junction J5 between resistor R2 and constant-current source 12, junction J6 between resistor R3 and constant-current source 13, and junction J7 between resistor R4 and constant-current source 14. Resistors R1, R2, R3 and R4 are connected to terminal T11 through buffer B2. At junctions J4, J5, J6 and J7, voltages, which are equal to the subtraction of the voltage drop in the resistors R1, R2, R3 and R4, respectively, from the voltage Vref of reference voltage generating circuit RS applied to terminal T11, are generated. By the selection of the resistance values of resistors R1, R2, R3 and R4 and the current values of constant current sources I1, I2, I3 and I4, the outputs of comparators AC1, AC2, AC3 and AC4 change from "0" to "1" in accordance with the degree of voltage drop of the output voltage Vm of brightness monitoring circuit MC, which is applied to terminal T10. The outputs of comparators AC1, AC2 and AC3 are connected to D input of D flip-flops DF3, DF4 and DF5. A latch pulse from terminal T18 of microcomputer 30 (FIG. 1) is applied to CP input through terminal T13 after a predetermined time interval (100 milliseconds) from the negative edge of the integration clear pulse. When the latch pulse from T 13 is applied, D flip-flops DF3, DF4 and DF5 store and generate from Q terminals thereof outputs which have been transmitted from comparators AC1, AC2 and AC3. At the same time the $\overline{Q}$ terminals produce inverse of the signals produced from the Q terminals. AN6 is an AND circuit, which is connected at its one input with the Q terminal of D flip-flop DF3 and at its other input with the $\overline{Q}$ output of D flip-flop DF4. AN7 is an AND circuit, which is connected at its one input with the $\overline{Q}$ terminal of D flip-flop DF4 and at its other input with Q terminal of D flip-flop DF5. Outputs b, c of AND circuit AN6 and AN7, $\overline{Q}$ terminal a of D flip-flop DF3, Q terminal d of DF5, and output e of comparator AC4 are defined as the output of brightness detection circuit 40. Accordingly, a signal on these lines a, b, c, d and e indicates the brightness level detected by light receiving element MP for monitoring use.

This will be described further in detail in connection with FIG. 5. In FIG. 5, W1, W2, W3 and W4 show different cases of the voltage drop in the output voltage signal from brightness monitoring circuit MC effected within the above described predetermined period (100 milliseconds), i.e., from time t0 (from the disappearance of integration clear pulse) until time t3. Also, W5 show a case when the voltage drop in the output voltage signal from brightness monitoring circuit MC effected within a period shorter than the above described predetermined period (100 milliseconds). More specifically, W1 shows a case when the voltage drop within said predetermined period is less than 0.35V; W2 shows a case when the voltage drop is above 0.35V and less than 0.7V; W3 shows a case when the voltage drop is above 0.7V and less than 1.4V; W4 shows a case when the voltage drop is above 1.4V and less than 2.8V; W5 shows a case when the voltage drop is above 2.8V within a period shorter than the above described period (100 milliseconds). The speed of voltage drop caused in either of W1, W2, W3, W4, W5 depends on the amount of the photoelectric current produced from light receiving element MP for monitoring use as described hereinabove. When the output voltage drop in the brightness monitor circuit MC is as represented by W1, W2, W3 or W4, the brightness of the image can be considered as relatively low. When the output voltage drop is as shown by W5, the brightness of the image can be considered as relatively high. If the resistance values of the above described resistors R1, R2, R3 and R4 and the current values of the constant current sources 11, 12, 13 and 14 are so selected that the voltage of junctions J4, J5, J6 and J7 are set to voltage levels which are lower than the output voltage V ref by amounts 0.35V, 0.7V, 1.4V and 2.8V, respectively, $\overline{Q}$ terminals of D flip-flops DF3, DF4 and DF5 and lines a, b, c, d and e carry different combinations of "0" and "1" for the above described cases W1–W5, as shown in the following Table 1.

TABLE 1

|    | DF3 |       | DF4 |   | DF5 |   |   |   |   |
|----|-----|-------|-----|---|-----|---|---|---|---|
|    | Q   | $\overline{Q}$(a) | Q   | $\overline{Q}$ | Q(d) | $\overline{Q}$ | b | c | e |
| W1 | 0   | 1     | 0   | 1 | 0   | 1 | 0 | 0 | 0 |
| W2 | 1   | 0     | 0   | 1 | 0   | 1 | 1 | 0 | 0 |
| W3 | 1   | 0     | 1   | 0 | 0   | 1 | 0 | 1 | 0 |
| W4 | 1   | 0     | 1   | 0 | 1   | 0 | 0 | 0 | 0 |
| W5 | 1   | 0     | 1   | 0 | 1   | 0 | 0 | 0 | 1 |

In the case of W5, output line d of comparator AC4 become "1" from "0" at time t2, i.e., before counting the predetermined period (100 milliseconds) from the disappearance of the integration clear pulse, i.e., from time t0.

The remaining circuit shown in Fig: 6 constitutes a circuit block 20 of FIG. 1. A reference number 22 is a subtraction circuit for generating voltage signal V1 corresponding to the difference between the output voltage Vos from image signal generating circuit VS applied from terminal T12 through the buffer B3 and the output voltage Vref from reference signal generating circuit RS applied from terminal T11 through buffer B2. A reference number 24 is a peak value detecting circuit, which detects and holds a peak value V2 (picture element signal having the lowest level) of all the image signals obtained from the accumulated charges on the diodes P2 to P9, which are eight diodes of ten diodes P1 to P10 masked with aluminum film in image sensor array PA with diodes P1 and P10 at the opposite ends being excluded. Thus, a signal V2 for correcting the smear is formed. Signal V2 is used for correcting the picture element signals corresponding to the accumulated charge in photodiodes, in the image sensor array PA receiving the above described first and second images, which are masked with the aluminum film. When the accumulated charges are sequentially transferred from CCD shift register SR to image signal generating circuit VS in response to transfer clock pulses $\phi 1$ and $\phi 2$, the microcomputer 30 produces a sampling pulse which is applied to terminal T15 through a data bus DB1 simultaneously with the start of the transfer of the accumulated charge of cell R5. Then, microcomputer 30 produces a sampling reset pulse which is applied to terminal T16 through data bus DB1 simultaneously with the completion of the transfer of the accumulated charge of cell R12. Accordingly, peak value detecting circuit 24 receives an image signal corresponding to the accumulated charges from cells R5 to R12, picture element signals corresponding to the accumulated charges in photodiodes P2 to P9, and detects and hold the peak value of all the received signals.

An amplifier 26 is provided for differentially amplifying output signals V1 and V2 from circuits 22 and 24, respectively. Amplifier 26 is constructed so that its amplification factor is controlled by the outputs a, b, c, d from the above described brightness detection circuit 40. In amplifier 26 OP is an operation amplifier having its input terminals f and g respectively connected to circuits 22 and 24 through input resistors R5 and R6. Resistors R7 through R14 are provided for setting the amplification factor of operational amplifier OP. When the resistance value of each of resistors R5, R6, R7, R8, R11 and R12 is r, resistors R9 and R13 each has the resistance value of 2r, and resistors R10 and R14 each has the resistance value of 4r. AS1 through AS8 are analog switches. Analog switches AS1 through AS4 are provided to determine the feedback resistance by selectively connecting resistors R7 through R10 between output and non-inverting input of operational amplifier OP in accordance with the outputs a, b, c and d. Analog switches AS5 through AS8 are provided to determine the biasing resistance by selectively connecting resistors R11 through R14 between the inverting input of operational amplifier OP and ground through a suitable voltage source E in accordance with the outputs a, b, c and d. Various conditions of these analog switches, and the resistors used for determining the feedback resistance and the resistors used for determining the biasing resistance are shown in Tables 2a and 2b below, in connection with various cases W1, W2, W3, W4 ad W5 described above.

TABLE 2a

| Case No. | AS1 | AS2 | AS3 | AS4 | AS5 | AS6 | AS7 | AS8 |
|---|---|---|---|---|---|---|---|---|
| W1 | ON | OFF | OFF | OFF | ON | OFF | OFF | OFF |
| W2 | OFF | ON | OFF | OFF | OFF | ON | OFF | OFF |
| W3 | OFF | OFF | ON | OFF | OFF | OFF | ON | OFF |
| W4 | OFF | OFF | OFF | ON | OFF | OFF | OFF | ON |
| W5 | OFF | OFF | OFF | ON | OFF | OFF | OFF | ON |

TABLE 2b

| Case No. | Feedback resistors | Biasing resistors | Amplification factor A |
|---|---|---|---|
| W1 | R7, R8, R9, R10 | R11, R12, R13, R14 | 8 |
| W2 | R7, R8, R9 | R11, R12, R13 | 4 |
| W3 | R7, R8 | R11, R12 | 2 |
| W4 | R7 | R11 | 1 |

TABLE 2b-continued

| Case No. | Feedback resistors | Biasing resistors | Amplification factor A |
|---|---|---|---|
| W5 | R7 | R11 | 1 |

In Table 2b, an amplification factor of operational amplifier OP is also shown. The output voltage from amplifier OP can be given by:

$$V\text{out} = E + (V2 - V1) \times A,$$

and V out is applied to A/D converter ADC. In the above formula, E is a constant voltage from voltage source E, and is set suitably in accordance with the input level range of A/D converter ADC. Each output of A/D converter ADC corresponding to each picture element signal is transmitted to microcomputer 30 of FIG. 1 through data bus DB1, whereby the focused condition of the objective lens through the digital of calculation is calculated based on a certain program. Since amplifier 26 of FIG. 1 changes the amplification factor in accordance with the output of brightness detecting circuit 40 thereby producing a signal suitable for signal processing in A/D transducer ADC, the focusing condition of the objective lens can be detected in a wide range of brightness.

Referring again to FIG. 1, the terminal T17 of microcomputer 30 is provided for generating the integration clear pulse. Also, from terminal T19 of microcomputer 30 a signal "1" is produced when the generation of the shift pulse is permitted, and a signal "0" is produced during the transfer of the accumulated electric charge from image sensor array PA to CCD shift register SR as described later, thereby inhibiting the generation of the shift pulse. Furthermore, a signal "1" is produced from terminal T18 of microcomputer 30 after a predetermined time interval from the disappearance of the integration clear pulse. This signal serves as a latch pulse for brightness detection circuit 40. The integration clear pulse produced from terminal T17 is applied to integration clear gate ICG of the image sensor in photoelectric conversion block 1 through terminal T6 and, at the same time, to flip-flop FF0. Thus, flip-flop FF0 produces "1" from its Q terminal, thereby enabling AND circuit AN1. Also, when a signal "1" for permitting the generation of the shift pulse from terminal T18 is produced during flip-flop FF0 is producing "1" from its Q terminal, AND circuit AN2 is also enabled. Terminal T14 of brightness detection circuit 40, which is connected to line e shown in FIG. 6, produces a signal "1" before the predetermined time interval (100 milliseconds) from the disappearance of the integration clear pulse t0, only when the brightness of the object is very high, such as in case W5 described above. On the contrary, when the brightness of the object is low, such as in case W1, W2, W3 or W4 of FIG. 5, terminal T18 of microcomputer 30 produces "1" at time t3, thereby maintaining "0" on line e, which is connected to terminal T15 of brightness detection circuit 40. Accordingly, when the brightness of the object is high, the output of AND circuit AN2 becomes "1" at time t2, and when the brightness of the object is low, the output of AND circuit AN1 becomes "1" at time t3. The signal "1" from either AND circuit AN1 or AN2 is applied to the D input of D flip-flop DF1 through OR circuit OR1. Since reference clock pulses (one cycle period is 2 microseconds) from the clock circuit CL1 is applied to the CK (clock) input of D flipflop DF1 the Q terminal of D flip-flop DF1 produces "1" in response to the negative edge of the reference clock pulse applied immediately after the supply of signal "1" to the D input, as shown in FIG. 7. Thus, flip-flop FF0 is reset, the resultant is such that AND circuits AN1 or AN2, which has been in the enabled state is disabled and, at the same time flip-flops FF1 through FF6 provided in the transfer clock pulse generating block 10 are all reset, thereby producing "0" from Q terminals Q1 through Q6. And when AND circuit AN1 or AN2 is disabled in the manner as described hereinabove, the Q terminal of the D flip-flop DF1 changes to "0" in response to the negative edge of the next reference clock pulse. As a result, a positive going pulse having a pulse width of 2 microseconds is produced from the Q terminal. The positive going pulse is used as the reset pulse. The Q terminal of the D flip-flop DF2 produced "1" in response to the negative edge of the reference clock pulse from clock circuit CL1 produced immediately after the generation of "1" from the Q terminal of D flip-flop DF1. Then, the Q terminal of D flip-flop DF2 produces "0" in response to the negative edge of the reference pulse from the same clock circuit CL1 produced immediately after the generation of "0" from the Q terminal of D flip-flop DF1. Accordingly, Q terminal of D flip-flop DF2 produces a positive going pulse having a pulse width of 2 microseconds. The positive edge of this pulse has a synchronized relationship with a negative edge of the reset pulse. The pulse produced from the Q terminal of D flip-flop DF2 is used as a shift pulse. The shift pulse is applied to terminal T21 of microcomputer 30 and, at the same time, is applied to shift gate SG of the image sensor provided in photoelectric conversion block 1 through terminal T7.

The foregoing description has been directed to the structure of the circuit shown in FIG. 1. Before the description proceeds to the operation, various signals obtained at major points in the circuit of FIG. 1 will be described below in connection with FIGS. 7 and 8.

Referring to FIG. 7, a relationship among outputs from flip-flops FF1 through FF6 produced immediately after the reset thereof in response to the reset pulse produced from the Q terminal of D flip-flop DF1, transfer pulse $\phi 1$ and the shift pulse produced from the Q terminal of D flip-flop DF2 is shown. In a similar manner as described above, by the positive edge of the reset pulse, all the flip-flops FF1 through FF6 are reset, thereby producing "0" from Q outputs Q1 through Q6 thereof. Accordingly, since OR gate OR2 produces "0", transfer-clock pulse $\phi 2$ changes its state from "1" to "0" and, on the contrary, transfer-clock pulse $\phi 1$ changes its state from "0" to "1". Then, after a time interval of 2 microseconds, the reset pulse changes to "0" and, at the same time, shift pulse changes to "1". The shift pulse is further changed to "0" after 2 microseconds.

OR gate OR2 produces "1" when Q terminal Q3 of flip-flop FF3 produces "1", that is, 8 microseconds after the negative edge "0" of the reset pulse. Accordingly, transfer-clock pulse $\phi 1$ continues to produce "1" for 10 microseconds. The shift pulse steps up and steps down while transfer-clock pulse $\phi 1$ is producing "1". As described above, transfer-clock pulse generation block 10 is reset immediately after time t2 or t3, and the shift pulse is produced only during the pulse interval of transfer-clock pulse $\phi 1$. This arrangement is particularly necessary to avoid the delay of completion of charge accumulation (photocurrent integration) in each of photodiodes P1, P2, P3, ..., Pn−2, Pn−1 and Pn provided in image sensor array PA. If the shift pulse were produced in a synchronized relationship with a transfer-clock pulse $\phi 1$ produced for the first time after time t2 or t3, there would be a possibility such that undesirable charge accumulation in each of photodiodes P1, P2, P3, ..., Pn−2, Pn−1 and Pn would take place, at the maximum, for a period of time equal to one cycle period of the transfer-clock pulse from time t2 or t3. In this case, if the object is very bright, the charges in the photodiodes will saturate, resulting in a poor image signal. Furthermore, since the time when the shift pulse is produced after time t2 or t3 is not fixed, there will be a problem such that the level of the image signal becomes unstable. In contradistinction, according to the pulses shown in FIG. 7, since the shift pulse is always produced within two cycle periods of the reference clock pulses, which is equal to 4 microseconds, from time t2 or t3, none of the above-described problems will occur.

As apparent from FIG. 7, the second transfer-clock pulse $\phi 1$ changes its state to "1" after 120 microseconds, that is, when all of the Q terminals Q3, Q4, Q5 and Q6 become "0", and this condition will be maintained for 8 microseconds. The transfer-clock pulses produced thereafter will each have a pulse duration of 8 microseconds with a pulse interval of 120 microseconds. Accordingly, one cycle period of transfer-clock pulse $\phi 1$ is 128 microseconds and, its duty cycle (a ratio of one pulse duration to one cycle period) is not $\frac{1}{2}$, but 1/15. When the pulses are arranged in the above-described manner, the transfer of the accumulated charge from each cell in CCD shift register SR to image signal output circuit VS is carried out by the negative edge of the transfer-clock pulse. Accordingly, the signal processing operation, such as A/D conversion in A/D converter ADC, will have sufficient time, thereby permitting the employment of an inexpensive A/D converter which operates at a moderate speed. Thus, a camera with an focus detection system can be manufactured at a low cost.

Referring to FIG. 8, output signals from image signal output circuit VS and amplifier 26, after generation of the shift pulse for the image sensor, are shown in connection with transfer-clock pulses $\phi 1$ and $\phi 2$ and an output signal from reference signal generation circuit RS. In the case of FIG. 8, at the moment when the shift pulse is generated, CCD shift register SR is emptied. The steps for emptying CCD shift register SR are such that transfer clock pulses $\phi 1$ and $\phi 2$ are applied to register SR for the number which is equal to the number of cells of shift register SR, with the electrical charges accumulated in photodiodes P1, P2, P3 ..., Pn−2, Pn−1 and Pn not shifted to register SR, For example, assuming that register SR contains 100 cells, all that is necessary in order to eliminate all the accumulated charges in that register is to apply 100 transfer-clock pulses $\phi 1$ and $\phi 2$ to register SR. Provided that, in the case where the image sensor is actuated for the first time, the unwanted charges in CCD shift register SR can not be eliminated by a single discharged operation. In such a case, the discharge operation is repeatedly carried out several times before the register SR is completely emptied. A series of such a discharge operation will hereinafter be referred to as an initialize operation for the image sensor. In FIG. 8, by the generation of the shift pulse, the accumulated charges in photodiodes P1, P2, P3, ..., Pn−2, Pn−1 and Pn will be transferred to CCD shift register SR parallelly. Then, by the negative edge of the first transfer-clock pulse $\phi 1$, the charge accumulated in cell R1 is transferred to image signal output circuit VS. As a result, image signal output circuit VS produces, from its terminal T3, an output signal Vos1 corresponding to the accumulated charge in cell R1. Thereafter, in response to the negative edge of each transfer-clock pulse $\phi 1$, output signals Vos2, Vos3, ..., Vos(n+3) corresponding to the accumulated charges in cells R2, R3, ..., Rn+3, respectively, are produced sequentially from image signal output circuit VS. Of all these produced signals, signals Vos1, Vos2 and Vos3 correspond to accumulated charges in cells R1, R2 and R3 provided for the idle transfer. Furthermore, signals Vos4 through Vos13 represent smear signals which correspond to the accumulated charges in cells R4 through R13, that is signals correspond to photodiodes P1 through P10 covered by the aluminum film. There will be a difference dS between these two types of output signals, which is based on the accumulated charge by the smear current produced by each of photodiodes P1 to P10. Output signal V1 from calculation circuit 22 is obtained by the following subtraction:

$$V1 = Vref - Vos$$

Of all the output signals from calculation circuit 22 corresponding to smear signals Vos4 through Vos13, smear signals Vos5 through Vos12 are applied to peak detection circuit 24 for detecting a peak V2 in smear signals Vos5 through Vos12. Peak signal V2 is stored and produced form peak detection circuit 24. In FIG. 8, a dotted line indicates the peak in smear signals Vos5 through Vos12. Thus, $$V = V1 - V2$$

corresponds to $$Vout = E + (V1 - V2) \times A,$$

which is produced from amplifier 26.

Figure 9B:
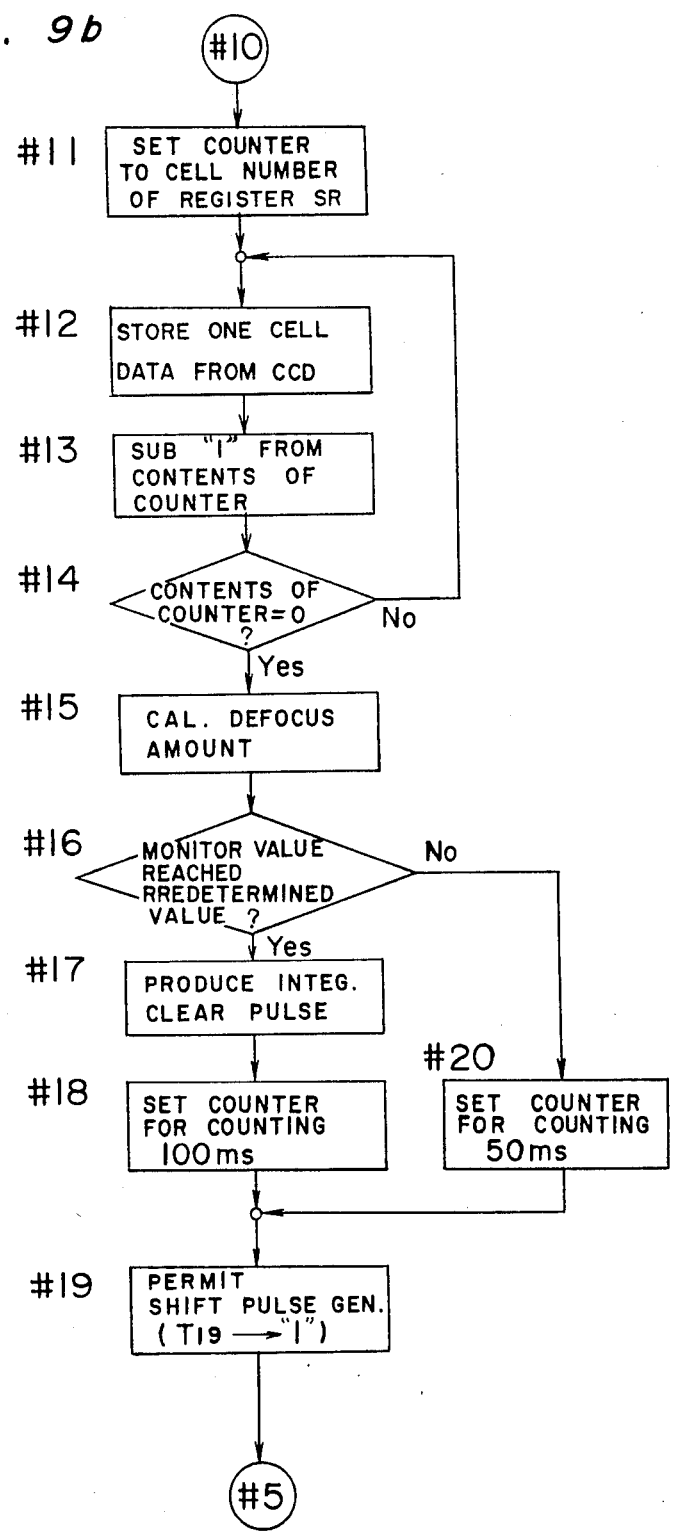

Next, the operation of the circuit shown in FIG. 1 will be described in connection with a flow chart shown in FIGS. 9a and 9b.

By the turn on of a switch (not shown), s start signal is applied to microcomputer 30. At step #1, microcomputer 30 produces, from its terminal T22, a signal "1" for carrying out the initialize operation of the image sensor. More specifically, clock circuit CL2 produces high frequency transfer-clock pulses $\phi 1$ and $\phi 2$ which are applied through terminals T4 and T5 to CCD shift register SR. At this moment, since terminal T19 is producing a signal "0" for inhibiting the generation of the shift pulse, CCD shift register SR sequentially transmits the unwanted charges accumulated therein without receiving any new charges transferred thereto from image sensor array PA. (Instead of the above, it is possible to permit the generation of the shift pulse. In such a case, a pulse is generated as in the case of a normal CCD drive operation. Immediately thereafter, a shift pulse is generated so that the accumulated charge can be disregarded. Then, the unwanted charges in the CCD shift register can be transferred by the transfer-clock pulse.) The transfer of the unwanted charges is carried out preferably several times, thereby completely emptying CCD shift register SR. One cycle operation of the transfer of the unwanted charges in CCD shift register SR is done by the use of a plurality of transfer-clock pulses $\phi 1$ and $\phi 2$, the number of which is equal to the number of cells provided in CCD shift register SR. After a time previously set for the initialization operation containing several cycles of the transfer of the unwanted charges in register SR described above, microcomputer 30 produces a signal "0" from its terminal T22, and thereafter, transfer-clock pulses $\phi 1$ having a duty cycle of 1/15 and transfer-clock pulses $\phi 2$ having the opposite phase to pulses $\phi 1$ are applied to shift register SR. Then, at step #2, microcomputer 30 produces a signal "1" from its terminal T19 for permitting the generation of a shift pulse. Then, at step #3, when the integration clear pulse is produced from terminal T17, flip-flop FF0 is reset, thereby enabling AND circuits AN1 and AN2. At the same time, the integration clear pulse is applied to integration clear gate ICG. Thus, the accumulated charges in each photodiode of image sensor array PA are cleared and, at the same time, FET Q1 and Q4 are conducted to charge each of capacitors C1 and C2 to a voltage level equal to the voltage of the power source shifted by the given voltage drop by FET Q1 and Q4. The integration clear pulse disappears at time t0, thereby starting the charge accumulation in each photodiode in image sensor array PA and, as a result, the output voltage Vm from brightness monitoring circuit MC starts to drop down in a manner shown in FIG. 5, at a speed relative to the intensity of the object as detected by monitoring light receiving element PM. Also, at the same time when the integration clear pulse disappears, microcomputer 30 sets a programmable preset counter provided internally thereof, at step #4, thereby start counting a predetermined period, such as 100 microseconds. Then, at step #5, based on the voltage level of signal on line e from brightness detecting circuit 40, which is applied to terminal T20, microcomputer 30 determines whether or not the amount of the voltage drop of the output voltage Vm has reached 2.8 volts. If line e is carrying "1" indicating the case W5 shown in FIG. 5, the program goes to step #9, thereby producing "0" from terminal T19 to inhibit the generation of shift pulse. It is to be noted that after a very short period from the moment when line e starts carry "1", D flip-flop DF1 produces a reset pulse and, subsequently, D flip-flop DF2 produces a shift pulse. By that reset pulse, flip-flop FF0 is reset and, accordingly, AND circuits AN1 and AN2 are disabled. Thus, the shift pulse, whose generation is inhibited, is the one which may be produced after step #10, as will be described later.

On the contrary, at step #5, if line e is carrying "0", microcomputer 30 determines that the amount of the voltage drop of the output voltage Vm has not reached 2.8 volts. Thus, the case is one of the cases W1, W2, W3 and W4 shown in FIG. 5. Thereafter, at step #6, "1" is subtracted from the contents of the programmable preset counter, and at step #7, it is detected whether or not the contents of the programmable preset counter is equal to "0". If not equal to "0", the program returns to step #5 to repeat the same steps #6 and #7, thereby repeating steps #5, #6 and #7. If it takes ts milliseconds for the procedure through steps #5, #6 and #7 for once, steps #5, #6 and #7 are repeated for N times which can be given as:

$$N = 100 \text{ milliseconds}/ts \text{ milliseconds}.$$

Accordingly, after the repetition of N times through steps #5, #6 and #7, the contents of the programmable preset counter becomes "0". More specifically, after 100 milliseconds from the set of the programmable preset counter, terminal T18 produces "1" (step #8) which is applied to through AND circuit AN1 and OR circuit OR1 to the D terminal of D flip-flop DF1. Thus, D flip-flop DF1 produces a reset pulse, thereby resetting flip-flop FF0 and enabling AND circuits AN1 and AN2. Thereafter, D flip-flop DF2 generates a shift pulse. It is to be noted that even in the above described case, if the output voltage Vm from brightness monitoring circuit MC drops down for an amount more than 2.8 volts at a later time, intensity detection circuit 40 produces "1" through line e, which is used for the detection at step #5, thereby producing "0" from terminal T19 for inhibiting the generation of the shift pulse.

The shift pulse generated in the above described manner is applied to terminal T21 of microcomputer 30 and, at the same time, applied to shift gate SG through terminal T7. Accordingly, the accumulated charge in each photodiode in image sensor array PA is transferred to a corresponding cell in CCD shift register SR. Furthermore, by transfer-clock pulses $\phi 1$ and $\phi 2$, the accumulated charge in each cell in register SR is sequentially transferred to image signal output circuit VS. Thereupon, image signals Vos1, Vos2, ... and Vos (n+3) are sequentially produced from terminal T3 of image signal output circuit VS. Thus, signals which can be given by the following equation:

$$V\text{out} = E + (V1 - V2)A$$

are sequentially produced from amplifier 26. These signals are then converted to digital signals through A/D converter ADC, and further applied to microcomputer 30 through data bus DB1.

When the above described shift pulse is applied to terminal T21 of microcomputer 30, terminal T17 produces an integration clear pulse at step #10. Accordingly, the accumulated charge in each photodiode in image sensor array PA is cleared, thereby starting the new charge accumulation upon disappearance of the integration clear pulse. The output from brightness monitoring circuit MC starts to drop down at a speed dependent on the light intensity of the object as detected by monitoring light receiving element PM. Thus, when the second cycle of the charge accumulation operation starts, the programmable preset counter in the microcomputer is set to count the number of cells provided in CCD shift register SR in response to the disappearance of the integration clear pulse (step #11). The signal corresponding to the accumulated charge in each cell is changed to the digital signal in A/D converter ADC and the digital signal is stored in the RAM (random access memory) in microcomputer 30 (step #12). Each time the digital signal is stored, the contents of the programmable preset counter is subtracted by "1" (step #13), and it is determined whether the content of the counter is reduced to "0" (step #14). When the content of the counter is reduced to "0", the program goes to step #15 at which a calculation described below is carried out to obtain focus adjustment information, i.e., the amount and the direction of defocus of an image on a predetermined image forming plane formed by objective lens TL.

The image of the object is formed on photodiode array defining image sensor array PA. Of the photodiodes P11, P12, P13, ..., Pn−2, Pn−1 and Pn, i.e., excluding P1 through P10, the photodiodes that receive the first image formed by the first reimaging lens L1, as described above in connection with FIG. 4, are referred to as photodiodes in the standard portion, and the photodiodes that receive the second image formed by the second reimaging lens L2 are referred to as photodiodes in the reference portion. In the following description, from one end of the array, the photodiodes in the standard portion are referred to as A1, A2, ..., and Am and the photodiode in the reference portion are referred to as B1, B2, ..., and Bm+k−1. Also, the A/D converted signals from photodiodes A1, A2, ..., and Am and B1, B2, ..., and Bm+k−1 are referred to as a1, a2, ..., and am and b1, b2, ..., and bm+k−1. In the microcomputer at step #15, the following calculations are carried out.

$$C1 = \sum_{i=1}^{m} |ai - bi|$$

$$C2 = \sum_{i=1}^{m} |ai - bi + 1|$$

.
.
.

$$Ck - 1 = \sum_{i=1}^{m} |ai - bi + k - 2|$$

and $$Ck = \sum_{i=1}^{m} |ai - bi + k - 1|$$

Then, of all the values C1, C2, ..., Ck−1 and Ck, the one that has the minimum value is obtained. For example, if C2 is the minimum, the image formed on photodiodes B2, B3, ..., Bm and Bm+1 in the reference portion is most similar to the image formed on photodiodes A1, A2, ... and Am in the standard portion. Accordingly, in this case, it is understood that the distance between the first and second images in the two portions is substantially equal to the distance between photodiodes A1 and B2. When this distance is compared with a distance between the first and second images formed when the objective lens is in the properly focused position, the amount and the direction of defocus of the objective lens can be calculated.

The above described method is merely one example, and therefore, any other methods and devices can be used. For example, it is possible to use the calculation method disclosed in the copending U.S. patent application Ser. No. 570,012, filed on Jan. 10, 1984, which is assigned to the same assignee as this application.

When the calculation in step #15 completes, it is detected at step #16 whether or not the amount of the voltage drop, effected during steps #11 to #15, at the output voltage Vm from brightness monitoring circuit MC has reached 2.8 volts in accordance with the signal from brightness detection circuit 40 through line e. It is to be noted that it takes, for example, 50 milliseconds to go through steps #11 through #15.

If line e is carrying "1", indicating that the voltage drop at the output voltage Vm has reached 2.8 volts, the integration clear pulse is produced again from terminal T17 at step #17, thereby clearing the charge in each photodiode in image sensor array PA accumulated during steps #11 to #15. By this operation, any saturation of the charges in the photodiodes can be avoided. Then, upon disappearance of the integration clear pulse, the programmable preset counter in microcomputer 30 is set and starts to count 100 milliseconds. At the same time, image sensor array PA starts to accumulate charge from the beginning. Thereafter, at step #18, a signal "1", which permits the generation of the shift pulse, is produced from terminal T19. Thereafter, the program returns to step #5 to repeatedly carry out the above described operation.

On the contrary to the above, at step #16, if line e is carrying "0" indicating that the voltage drop at the output voltage Vm has not yet reached 2.8 volts, the programmable preset counter is set and starts to count 50 milliseconds at step #20 and, thereafter, the program goes to step #19 described above. The counter is set to count 50 milliseconds, because in this operation, 50 milliseconds have been already passed after the disappearance of the integration clear pulse generated at step #10 and, therefore, it is necessary to count 50 milliseconds more which will add up to 100 milliseconds, during which period each photodiode in image sensor array PA carries out the charge accumulation. Accordingly, the procedure through steps #5, #7 and #8 is repeatedly carried out for 50/ts times. In the case where the programmable preset counter can be used only to count the period to carry out steps #5, #7 and #8 without sharing it for other purposes, all it is necessary is to set the programmable preset counter to count 100 milliseconds after the completion of step #10. In such a case, step #20 is not necessary.

As apparent from the above description, according to the present invention, when the transfer of the accumulated charge in the photodiodes in image sensor array PA starts in response to one shift pulse, the next shift pulse will not be produced until the calculations for obtaining the amount and direction of the defocus completes. Furthermore, each photodiode in image sensor array PA starts to accumulate immediately after the generation of one shift pulse without waiting the completion of the calculations for the defocus detection. The merit of this arrangement will be described hereinbelow.

When focusing an image by automatically moving the objective lens, an adjustment time for automatically moving the objective lens to the proper focusing position becomes short as the increase of the number of the focus detection operations carried out in a certain unit time. The time necessary to carry out one focus detection operation is the sum of an integration time Ti, during which the charges are accumulated in image sensor array PA in the CCD, and a data processing time Td, during which the accumulated charges in the image sensor array are transferred through CCD shift register SR to image signal output circuit VS and are processed in a caluclator to obtain amount and direction of defocus. Thus, one focus detection operation will take (Ti+Td), and when the focus detection operation is repeated for N times before the objective lens is moved to the proper focusing position, it will take N(Ti+Td) for the automatic lens adjustment.

Since the speed of the charge accumulation in image sensor PA is dependent on the intensity of the light impinging on the sensor, integration time Ti will become long when the birghtness of the image is relatively low. Accordingly, it will take a fairly long time to accumulate the charge to a reasonable level. Thus, the time (Ti+Td) for one focus detection operation will be expanded, thereby decreasing the number of focus detection operations that can be carried out in a certain unit time. The resultant is such that the adjustment time for moving the objective lens to the proper focusing position becomes long. Thus, one automatic focusing operation takes a relative long time.

Since there will be no problem to carry out the charge accumulation in image sensor array PA during the transfer of the accumulated charge from shift register SR to image signal output citcuit VS, it is possible to produce the integration clear pulse immediately after the generation of the shift pulse. If this is done, the charge accumulation can be started during the data processing time Td for processing the signal based on the accumulated charge obtained in the previous cycle. When this arrangement is employed, the integration time Ti can be expanded, for the object having a low brightness, without substantially expanding the actual time for the focus detection operation. Thus, the number of the focus detection operations can be maintained at a high number even when the object has a low brightness, thereby completing the focus adjustment in a short time. However, in any case, although it may be possible from the structural point, it is necessary to avoid the transfer of the accumulated charges from the photodiodes in image sensor array PA to CCD shift register SR during the transfer of the accumulated charges, in the previous cycle, stored in CCD shift register SR to image signal output circuit VS, or otherwise, the new accumulated charges and the old accumulated charges will be mixed together in CCD shift register SR. Also, during the calculation carried out at step #15, it is necessary to hold the data in the RAM and, therefore, no new data can be accepted. Thus, during the data processing time Td, the generation of the shift pulse is inhibited.

Figure 10A:
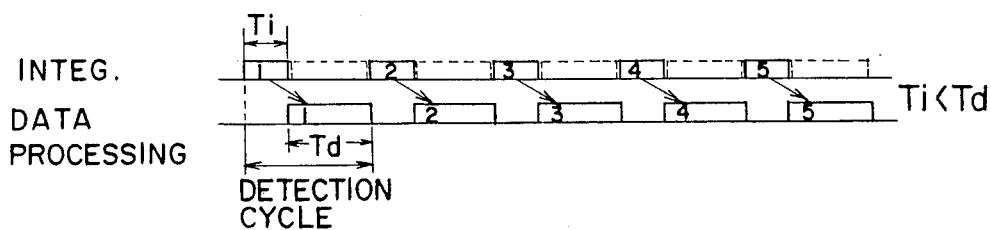
FIGS. 10a and 10b are time tables showing the repetition of the focus detection operations containing the steps of integration by the photodiode array and data processing, according to the embodiment shown in FIG. 1.
Figure 10B:
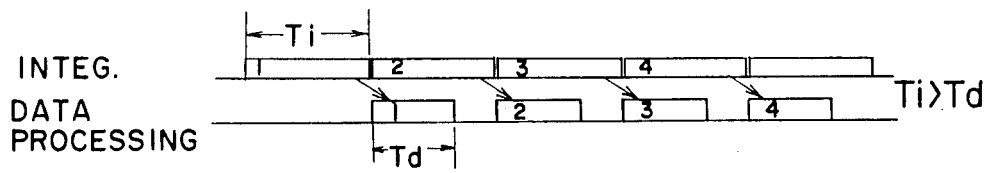

Referring to FIGS. 10a and 10b, a time chart is shown for carrying out the focus detection, using the above described embodiment, for two different cases. FIG. 10a shows the case when integration time Ti is shorter than data processing time Td, and FIG. 10b shows the case when integration time Ti is longer than data processing time Td. In FIG. 10a, a dotted line indicates the charge accumulation period after the disappearance of the integration clear pulse generated at step #10. The charge accumulated in this period is cleared by the integration clear pulse generated at step #17.

Figure 11A:
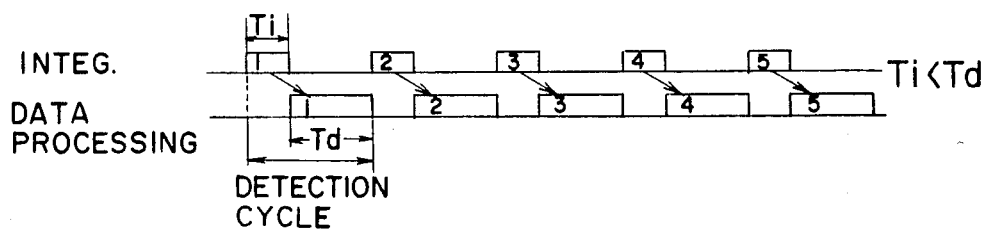
FIGS. 11a and 11b are time tables showing the repetition of the focus detection operations in the case when each photodiode starts the charge accumulation always after the data processing.
Figure 11B:
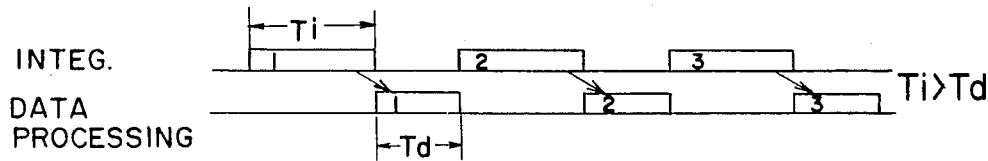

Referring to FIGS. 11a and 11b, a time chart is shown for carrying out the focus detection for two different cases, but the difference from the cases shown in FIGS. 10a and 10b is that the charge accumulation in the photodiodes in image sensor array PA always starts after the data processing. Like above, FIG. 11a shows the case when integration time Ti is shorter than data processing time Td, and FIG. 11b shows the case when integration time Ti is longer than data processing time Td. When the case shown in FIG. 11b is compared with that shown in FIG. 10b, the number of the focus detection operations that can be carried out in a certain unit time for the case of FIG. 10b is greater than that for the case of FIG. 11b.

Next, various modifications are described.

In the above embodiment, transfer-clock pulse $\phi 1$ for transferring the accumulated charge from CCD shift register SR to image signal output circuit VS is done by a train of pulses having a one cycle period of 128 microseconds, with the pulse width PW (when producing "1") being 8 microseconds and the pulse interval PI (when producing "0") being 120 microseconds. Thus, the duty cycle of this train of pulses can be given as follows. whereas a ratio PW:PI is equal to 1:15. It is preferable to set the ratio PW:PI between about 1:3 to about 1:20. The reason for this is explained below.

When the duty cycle is changed from 0.5, the frequency of the CCD's maximum transfer-clock pulse is defined by the time interval of either "0" state or "1" state which ever has the shorter time. When this fact is applied to the pulse $\phi1$, the frequency of the maximum transfer clock pulse is defined by the pulse interval PI. Thus, when the duty cycle is 0.5, the efficiency of that transfer-clock pulse can be given by 1/(PW+PI) (Hz), which is substantially equal to 1/2·PW (Hz). In order to permit the AD conversion of the image signal in AD converter ADC at a relatively low speed, that is, in order to permit the employment of a relatively low price AD converter for ADC, it is necessary to use a pulse having a long pulse width PW, that is, to use a pulse having a high efficiency of the transfer-clock pulse. However, when the ratio PW:PI becomes greater than 1:20, the pulse interval PI will not be elongated that much in comparison with the pulse width PW. Rather, when the ratio PW:PI becomes greater than 1:20, the pulse width becomes very narrow relative to the pulse interval so that by the stray capacitance of the CCD register, it becomes more difficult to transmit the pulse change to "1".

Figure 12:
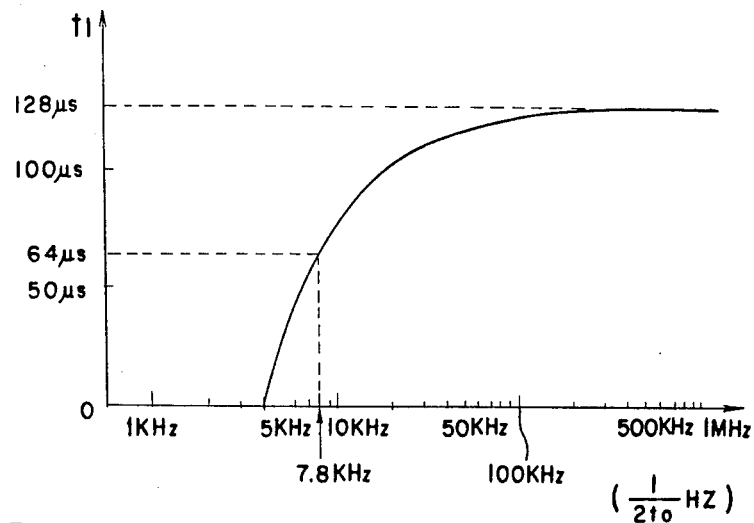
FIG. 12 is a graph showing a relationship between the ability of transfer by the transfer clock pulses and the sum of pulse interval periods of the same pulses.

Referring to FIG. 12, a graph is shown in which an abscissa and an ordinate represent, respectively, the efficiency of the transfer-clock pulse in different duty cycles of pulse $\phi1$ and the pulse interval PI. For instance, when the duty cycle of $\phi1$ is 0.5, PI=PW=64 microseconds, and in which case, the efficiency of the transfer-clock pulse is about 7.8 KHz. When the efficiency of the transfer-clock pulse is raised to ten times, that is to about 78 KHz, the pulse interval PI becomes nearly equal to 120 microseconds. If the efficiency is raised to twenty times, that is to about 156 KHz, the pulse interval PI becomes nearly equal to 125 microseconds, which is only a gain of 4 microseconds in pulse interval PI, whereas the efficiency of the transfer-clock pulse has been raised twice as much. Thus, even if the efficiency of the transfer-clock pulse is raised further, the pulse interval PI becomes closer to 128 microseconds, resulting in no substantial extension of the pulse interval PI. When the efficiency of the transfer-clock pulse becomes great, the pulse width PW becomes narrow. Thus, as explained above, it becomes difficult to drive the CCD using $\phi1$. According to the conventional CCD, there are some that use a transfer-clock pulse having a frequency of about 1 MHz, but such a CCD employs means for especially reducing the stray capacitance in the shift register portion. Thus, such a CCD has a complicated pattern of circuitry, resulting in a high manufacturing cost, and at the same time, is susceptible to noise signals. Furthermore, such a CCD has a problem in the reliability with respect to the electrostatic stress, resulting in a restriction in the actual use. Accordingly, it is not reasonable to increase the efficiency of the transfer-clock pulse to such a high frequency region having the above-mentioned problems.

Next, in the case where the ratio PW:PI is equal to about 1:3, the efficiency of transfer-clock pulse $\phi1$ will be about 15.6 KHz when PI=96 microseconds and PW=32 microseconds. When this is compared with a case in which the duty cycle is 0.5, the pulse interval is raised 1.5 times. Thus, a sufficiently long time is ensured for the A/D conversion to be carried out by A/D converter ADC. The duty cycle should not necessarily be more than 1.5 times 0.5, but can take any other value depending on the A/D conversion time of the A/D converter employed, so long as it is greater than that A/D conversion time. Although it is preferable to set the ratio PW:PI greater than 1:3, the present invention is applicable to any other ratio, even less than 1:3.

Generally, when the frequency of the transfer-clock pulse for the CCD becomes low, the light leakage in the shift register portion (transfer portion) greatly influences the image signal, but such an influence is little if the frequency is below 1 KHz.

In the above embodiment, the accumulated charge is transferred from the CCD shift register to the image signal processing circuit in accordance with two transfer-clock pulses $\phi1$ and $\phi2$ having different phases. However, it is possible to use three or more transfer-clock pulses having different phases for the transfer of such a charge. Even in such a case, according to the present invention, it is necessary for each pulse to set the ratio of pulse width "1" to pulse interval "0" as being less than 1, and to effect the charge transfer in response to each negative edge of the transfer-clock pulse, so that the A/D converter will have sufficient time, before the positive edge of the next transfer-clock pulse, to carry out the A/D conversion. The transfer-clock pulse should have its positive edge immediately after the reset of the transfer-clock pulse generation circuit effected by the reset pulse.

According to the present invention, the trial transfer operation in the image sensor is carried out several times at a high speed and, thereafter, one trial transfer operation is carried at a moderate, or normal, speed. Thus, the unwanted charges, if any, produced from the CCD shift register will be at the same level after the normal speed trial transfer operation. This is explained in detail below with the assumption that the CCD shift register comprises seven cells aligned in a row, and that the high speed trial transfer operation is carried out with the use of fast transfer-clock pulses having a frequency fH, and the normal speed trial transfer operation is carried out with the use of normal transfer-clock pulses having a frequency fL. Furthermore, it is assumed that an unwanted charge "q" is accumulated in each cell during a period 1/fH, and an unwanted charge "Q", which is greater than "q", is accumulated in each cell during a period 1/fL.

At the end of the high speed trial transfer operation, the first, second, third, fourth, fifth, and sixth cells carry unwanted charges "6q", "5q", "4q", "3q", "2q" and "q", respectively, while the seventh cell is empty.

Next, the normal speed trial transfer operation is carried out. Since there are seven cells in the array, the normal speed transfer operation will be carried out using seven normal speed clock pulses. At the end of the first normal speed clock pulse, the first, second, third, fourth, fifth, sixth and seventh cells carry unwanted charges "6q+Q", "5q+Q", "4q+Q", "3q+Q", "2+Q" "q+Q" and "Q", respectively. These unwanted charges are immediately shifted to the next cell and, at the same time, the unwanted charge "6q+Q" in the first cell is produced as an output signal. Then, at the end of the second normal speed clock pulse, unwanted charge "5q+2Q" is produced as an output signal. In this manner, unwanted charge "4q+3Q" is produced as an output signal at the end of the third signal. Similarly, at the end of the sixth normal speed clock pulse, the first, second, third, fourth, fifth, sixth and seventh cells carry unwanted charges "q+6Q", "6Q", "5Q", "4Q", "3Q", "2Q" and "Q", respectively, which are shifted to the next cell, with the unwanted charge "q+6Q" being produces as an output signal. At the end of the seventh normal speed clock pulse, the first, second, third, fourth, fifth, sixth and seventh cells carry unwanted charges "7Q", "6Q", "5Q", "4Q", "3Q", "2Q" and "Q", respectively, and the first cell produces unwanted charge "7Q" as an output signal. This will complete the trial transfer operation, and thereafter, the normal transfer operations are carried out with each cell carrying image signals.

As apparent from the above, during the trial transfer operation using the normal speed clock pulses, the serially produced output signals from the CCD shift register vary as "6q+Q", "5q+2Q", "4q+3Q", "3q+4Q", "2q+5Q", "q+6Q" and "7Q". Accordingly, if there were any information signals added to such unwanted signals, the information signals can not be properly evaluated due to the difference in the unwanted signals. However, after the trial transfer operation using the normal speed clock pulses, the serially produced unwanted output signals from the CCD shift register will have the constant level "7Q". Thus, the information signal added to such unwanted signals can be properly evaluated.

Figure 13:
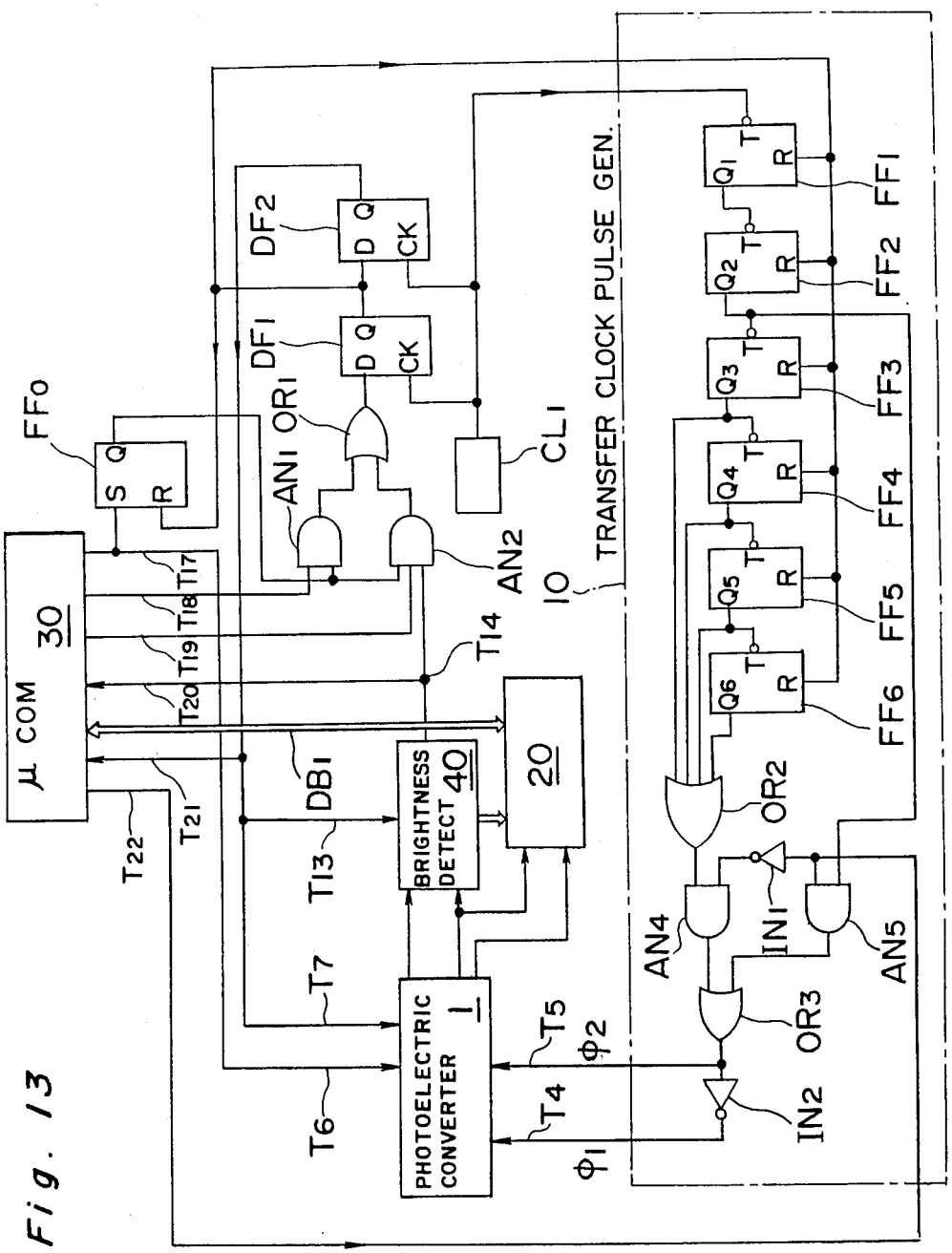
FIG. 13 is a circuit diagram of a focus detecting device according to a modification of the present invention.

Referring to FIG. 13, a modification of the circuit shown in FIG. 1 is shown. When compared with the circuit of FIG. 1, in this modification, there is no clock circuit CL2. Instead, AND circuit AN5 receives clock pulses from the Q terminal of flip-flop FF2, from which a clock pulse having a cycle length of 8 microseconds is produced. Furthermore, in this modification, the latch pulse applied to terminal T13 of brightness detector 40 is the shift pulse which is provided from the Q terminal of data flip-flop DF2. Thus, the latch pulse is generated in response to a signal produced from terminal T18 of microcomputer 30 and also to a signal from terminal T14 of brightness detector 40. The operation of the circuit of FIG. 13 will be described below.

When a start signal for starting the focus detection is applied to microcomputer 30, "1" is produced from terminal T22 thereby enabling AND circuit AN5. Then, the clock pulses from Q terminal Q2 of flip-flop FF2 is transferred through AND circuit AN5 and OR circuit OR3, thereby producing transfer-clock pulse $\phi 2$. An inverter IN2 produces another transfer-clock pulse $\phi 1$ having an opposite phase to that of transfer-clock pulse $\phi 2$. One cycle length of each of transfer-clock pulses $\phi 1$ and $\phi 2$ is 8 microseconds. The transfer of the accumulated charge in CCD shift register SR is carried out in response to the negative edge of a pulse $\phi 1$. At the same time when microcomputer 30 produces "1" from its terminal T22, a counter provided in the microcomputer is set and starts to count a time Tx, which is equal to one cycle period of the high speed trial transfer operation, i.e., equal to 8 microseconds x number of cells in shift register SR x number of times of high speed trial transfer operations. During time Tx, it is inhibited to generate an integration clear pulse from terminal T17 or to generate a pulse which permits the generation of a shift pulse from terminal T19. Also, during the same time, a calculation based on signals obtained from A/D converter ADC through data bus DB1 will not be carried out, or even if it was carried out, the result of the calculation will not be used for the display of focus detection or for the drive of objective lens TL. After counting the time Tx for the high speed trial transfer operation, the output signal from terminal T22 steps down to "0", thereby disabling AND circuit AN5 and, at the same time, enabling AND circuit AN4. Thus, the output signal from OR circuit OR2 is transmitted through AND circuit AN4 and OR circuit OR3, so that transfer-clock pulse $\phi 2$ is produced from OR circuit OR3 and transfer-clock pulse $\phi 1$ is produced from inverter IN2. The output signal from OR circuit OR2 is the logic sum of output signals from Q terminals Q3, Q4, Q5 and Q6 of flip-flops FF3, FF4, FF5 and FF6, respectively, and therefore, pulse $\phi 1$ has a cycle length of 128 microseconds. At the same time when terminal T22 produces "0", microcomputer 30 sets its counter to start counting time Ty for the normal speed trial transfer operation (128 microseconds x number of cells in CCD shift register SR). When the counting for time Ty is completed, terminal T17 produces an integration clear pulse and thereafter, terminal T19 produces a signal which permits the generation of a shift pulse, by which the image sensor array starts the charge accumulation.

Figure 15:
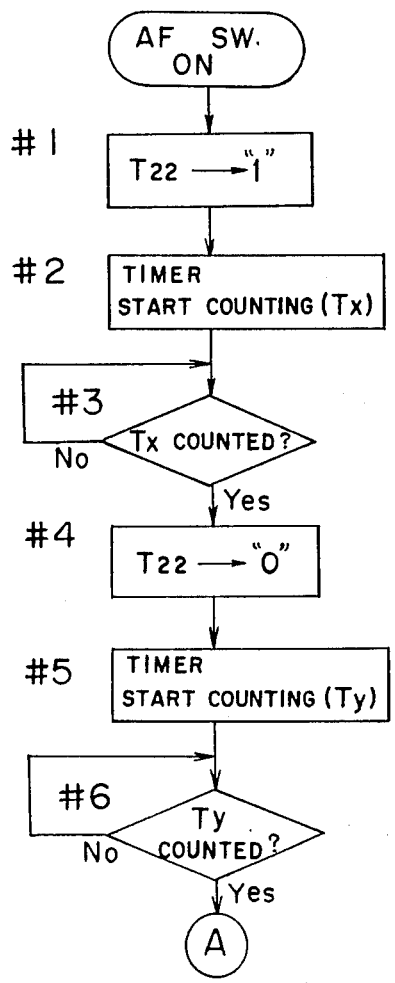
FIG. 15 is a flow chart showing the operation of the microcomputer provided in FIG. 13.
Figure 14:
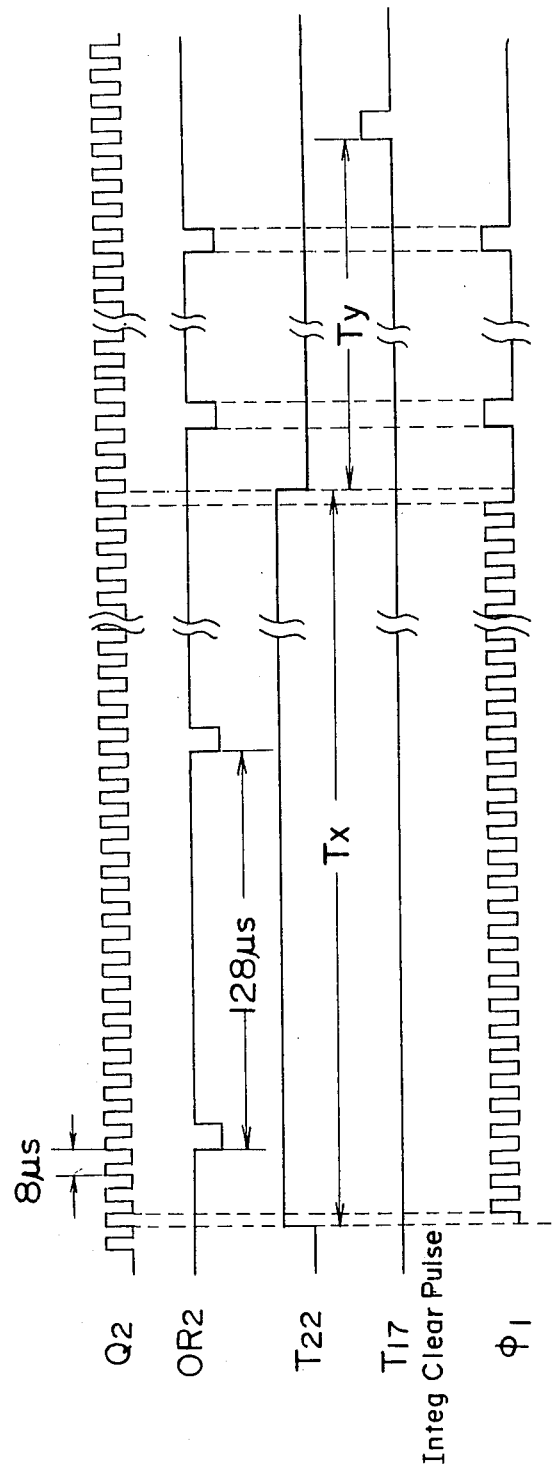
FIG. 14 is a graph showing waveforms of signals obtained at various major points in the circuit of FIG. 13.

Next, with reference to FIGS. 14 and 15, the operation of the circuit shown in FIG. 13 will be described.

By a switch (not shown), a start signal is applied to microcomputer 30. At step #1, microcomputer 30 produces, from its terminal T22, a signal "1", thereby starting the high speed trial transfer operation of the image sensor. More specifically, a clock pulse from Q terminal Q2 of flip-flop FF2 having a cycle period of 8 microseconds is applied through terminals T4 and T5 to CCD shift register SR. At this time, terminal T19 is producing a signal "0" for inhibiting the generation of a shift pulse, thereby no shift pulse is generated. Thus, without receiving any further accumulated charge from image sensor array PA, CCD shift register SR sequentially produces unwanted charges accumulated therein. At step #2, microcomputer 30 sets its counter with a time Tx for the high speed trial transfer operation. At step #3, it is detected whether or not the time Tx has passed. When it is detected that the time Tx has passed, the program advances to step #4 at which terminal T22 produces a signal "0", thereby changing the cycle period of each of the transfer-clock pulses $\phi 1$ and $\phi 2$, to be applied to CCD shift register SR, to 128 microseconds. Thus, the normal speed trial transfer operation is started. Simultaneously, microcomputer 30 sets its counter with a time Ty for the normal speed trial transfer operation. When the time Ty passes, the trial transfer operation is ended and, thereafter, the program goes to step #7, thereby starting the normal transfer operation. During the trial transfer operation as carried out up to step #6, the generation of the integration clear pulse from terminal T17 is inhibited and, therefore, microcomputer 30 will not carry out any calculation using signals obtained from A/D converter ADC, or even if it did carry out a calculation, the result thereof would not be used for the display or for driving objective lens TL.

In the modification described above, it has been described that the generation of an integration clear pulse during the trial transfer operation of the image sensor has been inhibited. However, if required, it is possible to generate the integration clear pulse at any appropriate time. Furthermore, during the trial transfer operation, microcomputer 30 will not carry out any calculation using signals obtained from A/D converter ADC, or even if it did carry out a calculation, the result thereof would not be used for the display or for driving objective lens TL. To this end, it is possible to arrange microcomputer 30 such that no signal from A/D converter ADC is accepted during that period or it is possible to provide, at an output portion of circuit 22, a gate means which will be disable during that period by a signal obtained from microcomputer 30.

According to the present invention described above, the self scanning type image sensor can be any other type than CCD, such as BBD (Bucket Brigade Device), CID (Charge Injection Device) or MOS (Metal Oxide Semiconductor). Furthermore, the optical arrangement for the focus detection can be any other arrangement than that shown in FIG. 4, for example, an arrangement disclosed in U.S. Pat. No. 4,333,007 can be used. In U.S. Pat. No. 4,333,007, lenslets are provided at an image forming plane by the objective lens or a conjugate plane thereto, and a self-scanning type image sensor is provided behind such a plane, thereby producing defocus amount and direction at the same time. Another arrangement is disclosed in U.S. Pat. No. 4,341,953, in which a self-scanning type image sensor is positioned at an image forming plane by the objective lens or a conjugate plane thereto and two other type self-scanning type image sensors are located at positions equally spaced from the image forming plane or the conjugate plane in the direction along the optical axis of the objective lens, thereby producing only the direction of defocus.

According to the present invention, the reference signal for the comparison with the output signal from monitoring circuit is produced from a circuit having the same characteristics as that of the monitoring circuit and, therefore, the reference signal has a high reliability regardless of the signal fluctuation in the output signal from the monitoring circuit. Thus, as long as there is no change in the aiming object, the shift pulse will always be produces at the same time delay.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

We claim:
1. An image sensing system comprising:
   image sensing means for sensing an image formed thereon, said image sensing means including a plurality of photosensitive elements adapted to accumulate electric charges at a speed dependent upon the intensity of light being incident thereon, respectively;
   serial output means for serially outputting electrical signals being indicative of the quantity of the electric changes accumulated in said photosensitive elements when the electric charges accumulated in said photosensitive elements are shifted thereto;
   clear pulse producing means for producing a clear pulse which causes said image sensing means to clear the electric charges accumulated in said photosensitive elements;
   photosensitive means for sensing the luminance of said image;
   a first accumulator having a charge accumulation path through which it accumulates electric charges at a speed dependent upon the luminance of said image sensed by said photosensitive means and adapted to produce an output voltage indicative of the quantity of the electric charges accumulated therein;
   a second accumulator having no charge accumulation path through which it accumulates electric charges at a speed dependent upon the luminance of said image sensed by said photosensitive means and adapted to produce an output voltage indicative of the electric charges accumulated therein;
   first and second charge clearing means for clearing the electric charges accumulated in said first and second accumulators in response to said clear pulse for restoring the output voltages thereof to a given initial voltage level, respectively;
   charge shifting means for shifting the electric charges accumulated in each of said photosensitive elements to said serial output means when said output voltage of said first accumulator represents a given relationship with respect to said output voltage of said second accumulator.

2. An image sensing system as defined in claim 1, wherein said charge shifting means includes:
   a comparator for comparing said output voltage of said first charge accumulator with the output voltage of said second charge accumulator to produce an output which is inverted from a first state to a second state when the former voltage represents the given relationship with respect to the latter voltage;
   a shift pulse generator for generating a shift pulse in response to the inversion of the output of said comparator; and
   a shift gate for shifting the electric charges accumulated in each of said photosensitive elements to said serial output means in response to said shift pulse.

3. An image sensing system as defined in claim 2, further comprising first and second buffers arranged between said first accumulator and said comparator and between said second accumulator and said comparator, respectively.

4. An image sensing system as defined in claim 1, wherein said given initial voltage level is a power source voltage level shifted by a predetermined level.

5. An image sensing system as defined in claim 2, further comprising:
   time counting means for counting a given period of time in response to said clear pulse; and
   means for producing a signal for forcing said shift pulse generator to generate said shift pulse in response to count-over of said given period of time by said time counting means when the inversion of the output of said comparator does not take place before the count-over.

6. An image sensing system as defined in claim 5, further comprising:
   means for discriminating the level of said time varying output voltage of said first accumulator in response to said signal for causing said shift pulse generator to generate said shift pulse; and
   means for amplifying said electric signals outputted from said serial output means at a rate dependent on the level of said time varying output voltage of said first accumulator discriminated by said discriminating means.

7. An image sensing system as defined in claim 1, further comprising means for processing said electric signals output from said serial output means and said reference voltage produced by said second accumulator to produce differences therebeween as a video signal.

8. An image sensing system comprising:
   image sensing means for sensing an image formed thereon, said image sensing means including a plurality of photosensitive elements adapted to accumulate electric charges at a speed dependent upon the intensity of light being incident thereon, respectively;
   a transfer pulse generator for generating transfer pulses changing between a first state and a second state;
   a shift register responsive to the changes of said transfer pulses from the first state to the second state for serially outputting the electric charges accumulated in said photosensitive elements when the electric charges are shifted thereto;
   a video signal generator for generating a video signal based on the electric charges serially outputted from said shift register;
   means for producing a characteristic output;
   means for producing a shift pulse in response to said characteristic output, said shift pulse causing said image sensing means to shift the electric charges accumulated in said photosensitive elements to said shift register; and
   means for causing said transfer pulse generator to set said transfer pulse to the first state in response to said characteristic output.

9. An image sensing system as defined in claim 8, further comprising a clear pulse generator for generating a clear pulse which causes said image sensing means to clear the electric charges accumulated in said photosensitive elements, and wherein said characteristic output producing means includes:
   photosensitive means for sensing the luminance of said image;
   a charge accumulator for accumulating electric charges at a speed dependent upon the luminance of said image sensed by said photosensitive means and producing a time varying output voltage indicative of the quantity of the electric charges accumulated therein;
   means for clearing the electric charges accumulated in said accumulator in response to said clear pulse;
   a reference voltage generator for generating a reference voltage; and
   a comparator for comparing said time varying output voltage with said reference voltage to produce said characteristic output when the former represents a given relationship with respect to the latter.

10. An image sensing device comprising:
    image sensing means for sensing an image formed thereon, said image sensing means including a plurality of photosensitive elements adapted to accumulate electric charges at a speed dependent upon the intensity of light being incident thereon, respectively;
    means for producing a charge accumulation start signal which causes said image sensing means to start the accumulation of the electric charges by said photosensitive elements;
    serial output means for serially outputting electric signals being indicative of the quantity of electric charges accumulated in said photosensitive elements when the electric charges accumulated in said photosensitive elements are shifted thereto;
    means for producing a shift pulse which causes said image sensing means to shift the electric charges accumulated in said photosensitive elements to said serial output means;
    a processor for processing said electric signals outputted from said serial output means; and
    means for causing said charge accumulation start signal producing means to produce said charge accumulation start signal in response to said shift pulse.

11. An image sensing device as defined in claim 10, further comprising inhibition means for inhibiting said shift pulse producing means from producing said shift pulse while said processor is processing said electric signals outputted from said serial output means.

12. An image sensing device as defined in claim 11, wherein said shift pulse producing means included:
    photosensitive means for sensing the luminance of said image;
    a charge accumulator for accumulating electric charges at a speed dependent upon the luminance of said image sensed by said photosensitive means in response to said charge accumulation start signal and producing a time varying output voltage indicative of the quantity of the electric charges accumulated therein;
    a reference voltage generator for generating a reference voltage;
    a comparator for comparing said time varying output voltage with said reference voltage to produce an output which is inverted from a first state to a second state when the former represents a given relationship with respect to the latter; and
    a shift pulse generator for generating said shift pulse in response to the inversion of the output of said comparator from the first state to the second state, said inhibition means being effective during the signal processing operation of said processor to inhibit the generation of said shift pulse while made ineffective upon termination of the signal processing operation of said processor to allow the generation of said shift pulse.

13. An image sensing system comprising:
    image sensing means for sensing an image formed thereon, said image sensing means including a plurality of photosensitive elements adapted to accumulate electric charges at a speed dependent upon the intensity of light being incident thereon, respectively;
    serial output means for serially outputting electric signals being indicative of the quantity of the electric charges accumulated in said photosensitive elements when the electric charges accumulated in said photosensitive elements are shifted thereto;
    means for producing a shift pulse which causes said image sensing means to shift the electric charges accumulated in said photosensitive elements to said serial output means;
    means for producing a control signal which changes from a first state to a second state, indicating transfer of said system from an initializing mode to a normal operation mode;
    means for producing transfer pulses which cause said serial output means to serially output the electric signals, the frequency of said transfer pulses being changeable between a normal frequency and a high frequency which is higher than said normal frequency, and said transfer pulses of said normal frequency causing said serial output means to effect the serial output of said electric signals at normal speed while said transfer pulses of said high frequency causing said serial output means to effect the serial output of said electric signals at high speed which is higher than said normal speed;

means responsive to the state of said control signal for applying said transfer pulses of said high frequency and said transfer pulses of said normal frequency to said serial output means in order so that the serial output of said electric charges is effected at the high speed of a plurality of times and then at the normal speed one time until the change of said control signal from the first state to the second state and so that the serial output of said electric charges is effected at the normal speed following the one time normal speed serial output of the electric charges after the change of said control signal from the first state to the second state; and means for producing a charge accumulation start signal in response to the change of said control signal from the first state to the second state.

14. An image sensing system comprising:

image sensing means for sensing an image formed thereon, said image sensing means including a plurality of photosensitive elements adapted to accumulate electric charges at a speed dependent upon the intensity of light being incident thereon, respectively;

a transfer pulse generator for generating transfer pulses changing from a first state and a second state at a predetermined frequency, the duty cycle of said transfer pulses being set so that the period of time in which said transfer pulses assume the second state is longer than the period of time in which said transfer pulses assume the first state;

a shift register responsive to each change of said transfer pulses from the first state to the second state for serially outputting the electric charges accumulated in said photosensitive elements when the electric charges are shifted thereto;

means for producing a shift pulse which causes image sensing means to shift the electric charges accumulated in said photosensitive elements to said shift register;

charge accumulation means for accumulating the electric charges serially outputted from said shift register in response to each change of said transfer pulses from the first state to the second state;

charge clearing means for clearing the electric charges accumulated in said charge accumulation means in response to each change of said transfer pulses from the second state to the first state;

means for producing an analog output indicative of the quantity of the electric charges accumulated in said charge accumulation means each time said charge accumulation means effects the charge accumulation, a series of the analog outputs forming an analog video signal; and an analog-to-digital converter for converting the analog outputs forming the analog video signal into digital outputs forming a digital video signal during the period of time in which said transfer pulses assume the second state.

15. An image sensing system comprising:

image sensing means for sensing an image formed thereon, said image sensing means including a plurality of photosensitive elements adapted to accumulate electric charges at a speed dependent upon the intensity of light being incident thereon, respectively;

a transfer pulse generator for generating transfer pulses changing from a first state and a second state at a predetermined frequency, the duty cycle of said transfer pulses being set so that the period of time in which said transfer pulses assume the second state is longer than the period of time in which said transfer pulses assume the first state;

a shift register responsive to each change of said transfer pulses from the first state to the second state for serially outputting the electric charges accumulated in said photosensitive elements when the electric charges are shifted thereto;

a video signal generator for generating an analog video signal on the basis of the electric charges outputted serially by the shift register;

an analog-to-digital converter for converting the analog video signal into a digital video signal corresponding to the analog video signal during the period of time in which said transfer pulses assume the second state, and a processor for serially reading and processing the digital video signal.

16. An image sensing system as defined in claim 15, wherein said video signal generator includes means for initiating the video signal generator in response to the first state of the transfer pulses.

* * * * *